United States Patent
Arakawa et al.

(10) Patent No.: US 9,298,517 B2
(45) Date of Patent: Mar. 29, 2016

(54) EXCLUSIVE CONTROL REQUEST ALLOCATION METHOD AND SYSTEM

(71) Applicant: FUJITSU LIMITED, Kawasaki-shi, Kanagawa (JP)

(72) Inventors: Yutaka Arakawa, Kobe (JP); Hisashi Sawada, Kobe (JP); Hiroyoshi Okada, Ibaraki (JP); Yasumi Izutani, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 14/251,249

(22) Filed: Apr. 11, 2014

(65) Prior Publication Data

US 2014/0373023 A1    Dec. 18, 2014

(30) Foreign Application Priority Data

Jun. 12, 2013  (JP) .................................. 2013-124197

(51) Int. Cl.
  *G06F 9/50*  (2006.01)
  *G06F 9/52*  (2006.01)

(52) U.S. Cl.
  CPC .............. *G06F 9/5083* (2013.01); *G06F 9/505* (2013.01); *G06F 9/52* (2013.01)

(58) Field of Classification Search
  None
  See application file for complete search history.

(56) References Cited

U.S. PATENT DOCUMENTS 5,881,283 A     3/1999   Hondou et al.

FOREIGN PATENT DOCUMENTS

| JP | 08-272632 | 10/1996 |
|----|-----------|---------|
| JP | 08-286958 | 11/1996 |
| JP | 09-073411 | 3/1997  |
| JP | 11-203151 | 7/1999  |
| JP | 2006-164082 | 6/2006 |
| JP | 2009-037369 | 2/2009 |

*Primary Examiner* — Qing Wu
(74) *Attorney, Agent, or Firm* — Fujitsu Patent Center

(57) ABSTRACT

A management server specifies processes that make exclusive control requests of files in a predetermined time slot, based on an execution schedule of a plurality of processes. Then, the management server specifies files that are the subjects of exclusive control in the predetermined time slot, based on utilization file information indicating files that are used by the respective processes. Then, the management server determines a plurality of file management servers as destinations of exclusive control requests of the respective specified files such that the number of exclusive control requests to be transmitted in the predetermined time slot to each of the file management servers, which is configured to perform exclusive control of a file, is not greater than a predetermined number of exclusive control requests.

8 Claims, 25 Drawing Sheets

FIG. 13

64 FILE LIST

| JOB NAME | DIRECTORY NAME | FILE NAME | START TIME | END TIME |
|---|---|---|---|---|
| SALES ANALYSIS JOB | /zaiko/data | zaikoA_20121007.dat | 02:10 | 02:18 |
| SALES ANALYSIS JOB | /indata | uriageA_20121010.dat | 02:10 | 02:18 |
| SALES ANALYSIS JOB | /tempo | tempoA.dat | 02:10 | 02:18 |
| ... | | | | |
| INVENTORY ANALYSIS JOB | /zaiko/data | zaikoB_20121010.dat | 02:15 | 02:20 |
| INVENTORY ANALYSIS JOB | /tempo | tempoB.dat | 02:15 | 02:20 |
| ... | | | | |
| PURCHASE JOB | /zaiko/data | zaikoC_20121008.dat | 02:17 | 02:25 |
| PURCHASE JOB | /indata | shiireC_20121010.dat | 02:17 | 02:25 |
| PURCHASE JOB | /tempo | tempoC.dat | 02:17 | 02:25 |
| ... | | | | |
| SALES ANALYSIS JOB2 | /zaiko/data | zaikoD_20121009.dat | 02:20 | 02:32 |
| SALES ANALYSIS JOB2 | /indata | uriageD_20121010.dat | 02:20 | 02:32 |
| SALES ANALYSIS JOB2 | /tempo | tempoD.dat | 02:20 | 02:32 |

FIG. 14

64 FILE LIST (SORTED BY TIME)

| | | | | |
|---|---|---|---|---|
| ... | | | | |
| SALES ANALYSIS JOB | /zaiko/data | zaikoA_20121007.dat | 02:10 | — |
| SALES ANALYSIS JOB | /indata | uriageA_20121010.dat | 02:10 | — |
| SALES ANALYSIS JOB | /tempo | tempoA.dat | 02:10 | — |
| ... | | | | |
| INVENTORY ANALYSIS JOB | /zaiko/data | zaikoB_20121010.dat | 02:15 | — |
| INVENTORY ANALYSIS JOB | /tempo | tempoB.dat | 02:15 | — |
| PURCHASE JOB | /zaiko/data | zaikoC_20121008.dat | 02:17 | — |
| PURCHASE JOB | /indata | shiireC_20121010.dat | 02:17 | — |
| PURCHASE JOB | /tempo | tempoC.dat | 02:17 | — |
| ... | | | | |
| SALES ANALYSIS JOB | /zaiko/data | zaikoA_20121007.dat | — | 02:17 |
| SALES ANALYSIS JOB | /indata | uriageA_20121010.dat | — | 02:17 |
| SALES ANALYSIS JOB | /tempo | tempoA.dat | — | 02:17 |
| SALES ANALYSIS JOB2 | /zaiko/data | zaikoD_20121009.dat | 02:20 | — |
| SALES ANALYSIS JOB2 | /indata | uriageD_20121010.dat | 02:20 | — |
| SALES ANALYSIS JOB2 | /tempo | tempoD.dat | 02:20 | — |
| ... | | | | |
| INVENTORY ANALYSIS JOB | /zaiko/data | zaikoB_20121010.dat | — | 02:20 |
| INVENTORY ANALYSIS JOB | /tempo | tempoB.dat | — | 02:20 |
| PURCHASE JOB | /zaiko/data | zaikoC_20121008.dat | — | 02:25 |
| PURCHASE JOB | /indata | shiireC_20121010.dat | — | 02:25 |
| PURCHASE JOB | /tempo | tempoC.dat | — | 02:25 |
| ... | | | | |
| SALES ANALYSIS JOB2 | /zaiko/data | zaikoD_20121009.dat | — | 02:32 |
| SALES ANALYSIS JOB2 | /indata | uriageD_20121010.dat | — | 02:32 |
| SALES ANALYSIS JOB2 | /tempo | tempoD.dat | — | 02:32 |
| ... | | | | |

9,000 FILES 6,000 FILE

| PURCHASE JOB | /indata | shiireC_20121010.dat | 02:17 | — |
|---|---|---|---|---|
| ... | | | | |
| SALES ANALYSIS JOB | /indata | uriageA_20121010.dat | — | 02:17 |
| SALES ANALYSIS JOB | /tempo | tempoA.dat | — | 02:17 |
| ... | | | | |
| PURCHASE JOB | /tempo | tempoC.dat | 02:17 | — |
| SALES ANALYSIS JOB | /zaiko/data | zaikoA_20121007.dat | — | 02:17 |
| ... | | | | |
| PURCHASE JOB | /zaiko/data | zaikoC_20121008.dat | 02:17 | — |

THE NUMBER OF FILE MANAGEMENT SERVERS: 3

FIG. 16

EXCLUSIVE CONTROL REQUEST ALLOCATION METHOD AND SYSTEM

CROSS-REFERENCE TO RELATED APPLICATION

This application is based upon and claims the benefit of priority of the prior Japanese Patent Application No. 2013-124197, filed on Jun. 12, 2013, the entire contents of which are incorporated herein by reference.

FIELD

The embodiments discussed herein are related to an exclusive control request allocation method and a system.

BACKGROUND

Recent computer systems often execute several tens of thousands to several hundreds of thousands of jobs overnight. Further, the amount of data to be processed is explosively increasing, so that it is becoming more common to handle several thousands to several tens of thousands of files.

With the increase in the number of jobs to be executed and the increase in the number of files to be handled, the execution time of tasks performed by a plurality of jobs is increasing. Therefore, there may be cases in which batch processing that needs to be finished within a specified time period does not complete within the specified time period, for example. Determination of whether batch processing completes within a specified time period may be made by estimating the batch processing time. As a technique for estimating the batch processing time, there has been proposed a method for estimating the batch processing time in a computer system capable of executing a plurality of jobs in parallel.

A solution for the case where batch processing might not complete within a specified time period may be to enhance the execution server, or to provide additional execution servers. Enhancing a server is to enhance the performance of a server. Providing additional servers is to increase the number of servers that execute jobs. Conventionally, in the case where a system does not have sufficient processing capacity, it was common to enhance the server. However, it is becoming difficult to handle the recent explosive increase in the amount of data to be processed by only enhancing the server. Then, additional servers are provided.

In the case where additional servers are provided, a large number of jobs are distributed to and executed by a plurality of servers. When executing the distributed jobs on the plurality of servers, the plurality of servers that execute the jobs share the files used for executing the jobs. Then, in order to prevent a file from being broken due to simultaneous updates of the file by a plurality of jobs running in parallel, the file is placed under exclusive control. When the file is under exclusive control, the file is managed in such a manner that as long as a certain server has an exclusive right to use the file, other servers are prevented from using the file.

For example, in addition to servers that execute jobs, a file exclusive control apparatus is provided. Thus, the file exclusive control apparatus performs exclusive control of a shared-file. As a technique related to file exclusive control apparatuses, there has been proposed a file exclusive control system that prevents concentration of processing load on a part of computers and file exclusive control apparatuses included in a parallel computer, and thereby prevents a reduction in the processing capacity of the entire parallel computer. In this file exclusive control system, for example, a plurality of file exclusive control apparatuses calculate the imbalance in the job processing load among a plurality of computers, using load information of each of the plurality of computers. Then, a job allocation is set again so as to eliminate the imbalance in the load.

Examples of the related art are disclosed in Japanese Laid-open Patent Publications No. 11-203151 and No. 2006-164082.

With the related-art techniques, however, in the case where a plurality of file exclusive control apparatuses perform exclusive control of files, the processing load of exclusive control on each file exclusive control apparatus is not accurately determined. Therefore, even when file exclusive control requests are distributed to the file exclusive control apparatuses, the number of exclusive control requests processed by each file exclusive control apparatus is not balanced. This might result in a delay in processing the exclusive control requests, and hence a reduction in the processing efficiency of the entire system.

SUMMARY

According to one aspect of the invention, there is provided a non-transitory computer-readable storage medium storing a computer program that causes a computer to perform a process including: specifying processes that make exclusive control requests of files in a predetermined time slot, based on an execution schedule of a plurality of processes; specifying files that are subjects of exclusive control in the predetermined time slot, based on utilization file information indicating files that are used by the respective processes; and determining a plurality of file management servers as destinations of exclusive control requests of the respective specified files such that the number of exclusive control requests to be transmitted in the predetermined time slot to each of the file management servers, which is configured to perform exclusive control of a file, is not greater than a predetermined number of exclusive control requests.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an example of a file list;

FIG. 14 illustrates an example of a sorted file list;

FIG. 16 illustrates the sorted result of records in a time slot in which an excessively large load is placed;

DESCRIPTION OF EMBODIMENTS

Figure 1:
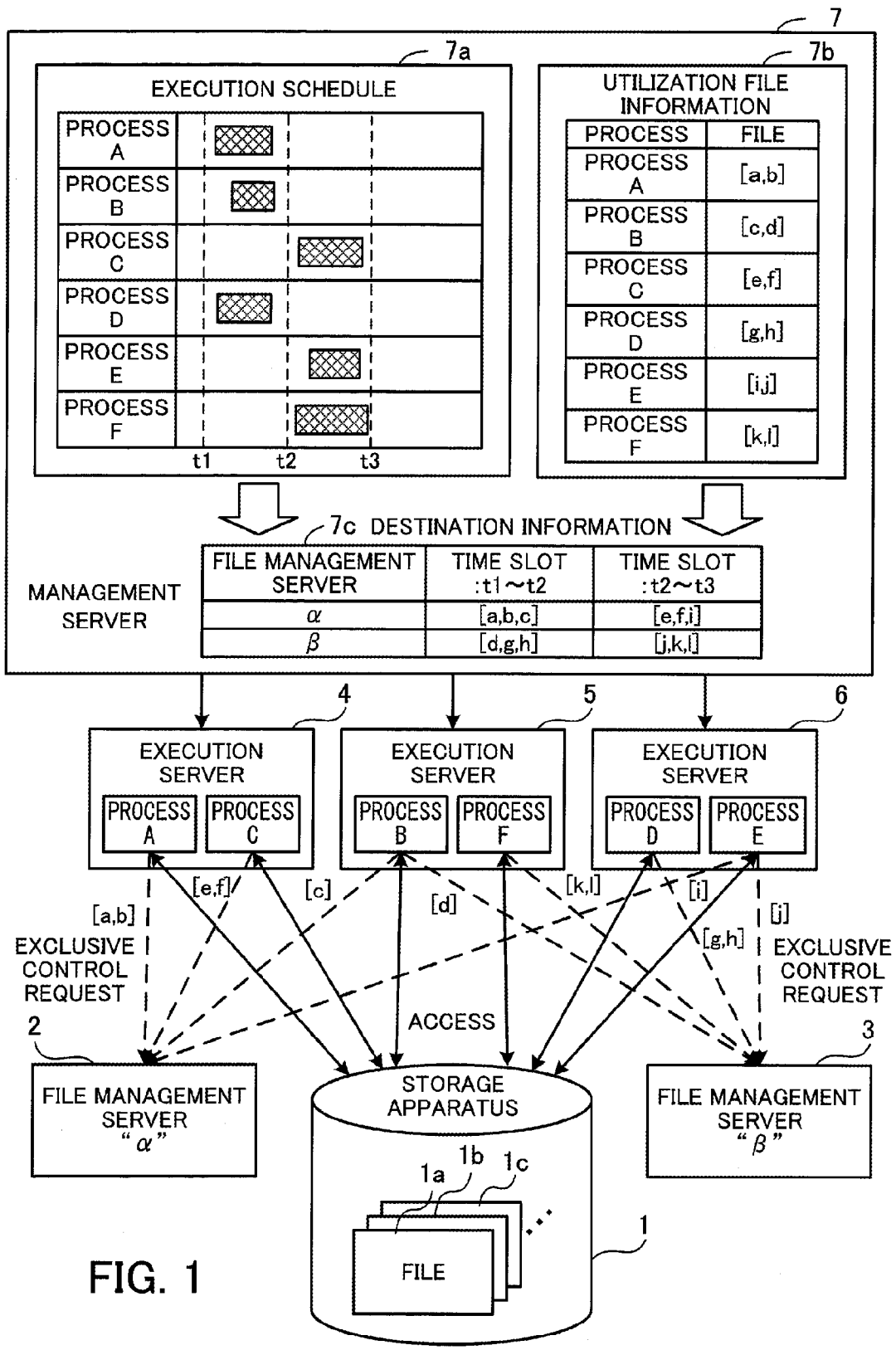
FIG. 1 illustrates an exemplary configuration of a system according to a first embodiment.

Several embodiments will be described below with reference to the accompanying drawings, wherein like reference numerals refer to like elements throughout.

Note that features of certain embodiments may be combined with features of other embodiments as long as no inconsistency arises.

(a) First Embodiment

First, a description will be given of a first embodiment.

FIG. 1 illustrates an exemplary configuration of a system according to a first embodiment. In the first embodiment, a storage apparatus 1 stores a plurality of files 1a, 1b, 1c, and so on. The plurality of files 1a, 1b, 1c, and so on stored in the storage apparatus 1 are shared by a plurality of execution servers 4 through 6.

File management servers 2 and 3 manage the plurality of files 1a, 1b, 1c, and so on stored in the storage apparatus 1. For example, the file management servers 2 and 3 perform exclusive control of files. That is, in response to an exclusion acquisition request specifying a file used by a process, each of the file management servers 2 and 3 permits the process to exclusively use the file. If an exclusion acquisition request of the file being exclusively used is received thereafter, each of the file management servers 2 and 3 rejects the received exclusion acquisition request. Further, upon receiving an exclusion release request of the file after completion of the process using the file, each of the file management servers 2 and 3 releases exclusive use of the file, and allows the file to be used by other processes. The exclusion acquisition request and the exclusion release request are hereinafter also referred to collectively as an "exclusive control request".

Each of the execution servers 4, 5, and 6 executes a process in response to an execution request of a process from a management server 7. Each of the execution servers 4, 5, and 6 exclusively uses files that are used in an executing process. Therefore, when starting execution of a process, each of the execution servers 4, 5, and 6 transmits exclusion acquisition requests of files used by the process to any of the file management servers. Note that the file management server to which each exclusion acquisition request is to be transmitted is specified in advance by the management server 7. Upon completing the process, each of the execution servers 4, 5, and 6 transmits exclusion release requests of the files used by the process to the same file management servers to which the exclusion acquisition requests of the files are transmitted.

The management server 7 stores an execution schedule 7a of a plurality of processes and utilization file information 7b indicating files that are used by the respective processes. Then, based on the execution schedule 7a and the utilization file information 7b, the management server 7 transmits an execution request of a process to each of the execution servers 4, 5, and 6, and specifies the destinations of exclusive control requests of files used by the process. The destinations of the exclusive control requests are determined as follows.

The management server 7 specifies processes that make exclusive control requests of files in a predetermined time slot, based on the execution schedule 7a. For example, the management server 7 divides the process execution period into a plurality of unit time slots. Then, in the case where the number of exclusive control requests of files that are made in a unit time slot is greater than a predetermined number of exclusive control requests, the management server 7 specifies processes that make exclusive control requests of files in the unit time slot.

Note that determination of whether processes that make exclusive control requests in a predetermined time slot may be made based on whether the processes start or end in this time slot. For example, the management server 7 determines processes that start or end in a predetermined time slot as processes that make exclusive control requests of files in this time slot.

When the processes that make exclusive control requests of files in the time slot are specified, the management server 7 specifies files that are the subjects of exclusive control in the predetermined time slot, based on the utilization file information 7b indicating files that are used by the respective processes. For example, the management server 7 specifies the files used by the specified processes as the subjects of exclusive control in the predetermined time slot.

When the files that are the subjects of exclusive control are specified, the management server 7 determines file management servers as the destinations of exclusive control requests of the respective specified files. In this step, the management server 7 determines the destinations such that the number of exclusive control requests to be transmitted in the predetermined time slot to each of the file management servers, which is configured to perform exclusive control of a file, is not greater than a predetermined number of exclusive control requests. For example, the management server 7 determines the destinations of the exclusive control requests such that an equal number of exclusive control requests are transmitted to each of the plurality of file management servers.

Then, the management server 7 transmits destination information 7c indicating the file management servers as the destinations of the exclusive control requests of the respective specified files, to the execution servers that perform the specified processes. For example, when the start time of the predetermined time slot comes, the management server 7 transmits the destination information 7c indicating the destinations of exclusive control requests to be made in this time slot.

According to this system, the destination information 7c is first generated by the management server 7, based on the execution schedule 7a and the utilization file information 7b. In the example of FIG. 1, the execution schedule 7a indicates that processes A, B, and D are executed in a time slot t1 to t2. Meanwhile, the utilization file information 7b indicates that files a and b are used by the process A; files c and d are used by the process B; and files g and h are used by the process D. Thus, the management server 7 determines the destinations of the exclusive control requests of the respective files such that the exclusive control requests are evenly transmitted to the file management servers 2 and 3 in the time slot "t1 to t2". For example, the management server 7 selects the file management server 2 with the name "α" as the destination of the exclusive control requests of the files a, b, and c, and selects the file management server 3 with the name "β" as the destination of the exclusive control requests of the files d, g, and h.

Similarly, based on the processes (the processes C, E, and F) that transmit exclusive control requests in a time slot t2 to t3, the destinations of the exclusive control requests of files that are used by each of the processes C, E, and F in this time slot t2 to t3 are determined. In the example of FIG. 1, the file management server 2 with the name "α" is selected as the destination of the exclusive control requests of the files e, f, and i, and the file management server 3 with the name "β" is selected as the destination of the exclusive control requests of the files j, k, and l.

When the destinations of the exclusive control requests are determined, the destination information 7c indicating the determination result is delivered from the management server 7 to each of the execution servers 4, 5, and 6.

Subsequently, in the time slot t1 to t2, the management server 7 transmits execution instructions of the processes A, B, and D to the respective execution servers 4, 5, and 6, in accordance with the execution schedule 7a. The execution server 4 that performs the process A transmits an exclusive control request of the files a and b to the file management server 2, based on the destination information 7c. The execution server 5 that performs the process B transmits an exclusive control request of the file c to the file management server 2, and transmits an exclusive control request of the file d to the file management server 3, based on the destination information 7c. The execution server 6 that performs the process D transmits an exclusive control request of the files g and h to the file management server 3, based on the destination information 7c.

Then, in the time slot t2 to t3, the management server 7 transmits execution instructions of the processes C, E, and F to the respective execution servers 4, 5, and 6, in accordance with the execution schedule 7a. The execution server 4 that performs the process C transmits an exclusive control request of the files e and f to the file management server 2, based on the destination information 7c. The execution server 6 that performs the process E transmits an exclusive control request of the file i to the file management server 2, and transmits an exclusive control request of the file j to the file management server 3, based on the destination information 7c. The execution server 5 that performs the process F transmits an exclusive control request of the files k and l to the file management server 3, based on the destination information 7c.

In this way, in the first embodiment, files that are the subjects of exclusive control in a predetermined time slot are specified, and the destinations of exclusive control requests of the specified files are determined. This makes it possible to appropriately distribute exclusive control requests of files. Accordingly, it is possible to prevent a reduction in the processing efficiency of the entire system due to a delay in file exclusive control.

It is possible to determine the load concentration that occurred in the past, based on the past load information on the central processing unit (CPU) busy percentage, the number of file accesses, and the like. However, it is not possible to determine in which time slot a burst of exclusive control requests will be caused by the processes to be executed, based on the past load information. Therefore, even if a determination on whether there is a burst of exclusive control requests is made based on the past load information, it becomes possible to level the load only after load concentration has actually occurred. For example, in the case where performance information is collected at 1 minute intervals, load concentration continues for at least 1 minute, which might result in an increase in process execution time. In the case of a related-art method, in order to avoid such an issue, a determination of when to change the destinations of exclusive control requests of files needs to be made by a person. Thus, a determination error is likely to occur.

Accordingly, in the first embodiment, the time slot in which a delay in exclusive control is likely to occur is determined based on the execution schedule of the processes. Therefore, it is possible to accurately determine in which time slot the number of exclusive control requests actually becomes excessive. Thus, it is possible to change the destinations of exclusive control requests before the load becomes excessive, such that the exclusive control requests are evenly transmitted to the destinations in this time slot.

Further, the correlation between the load information (such as the CPU busy percentage, the number of file accesses, and the like) and the number of exclusive control requests is often poor. Therefore, the amount of the load of exclusive control is not accurately determined from the load information such as the CPU busy percentage, the number of file accesses, and the like.

Figure 2:
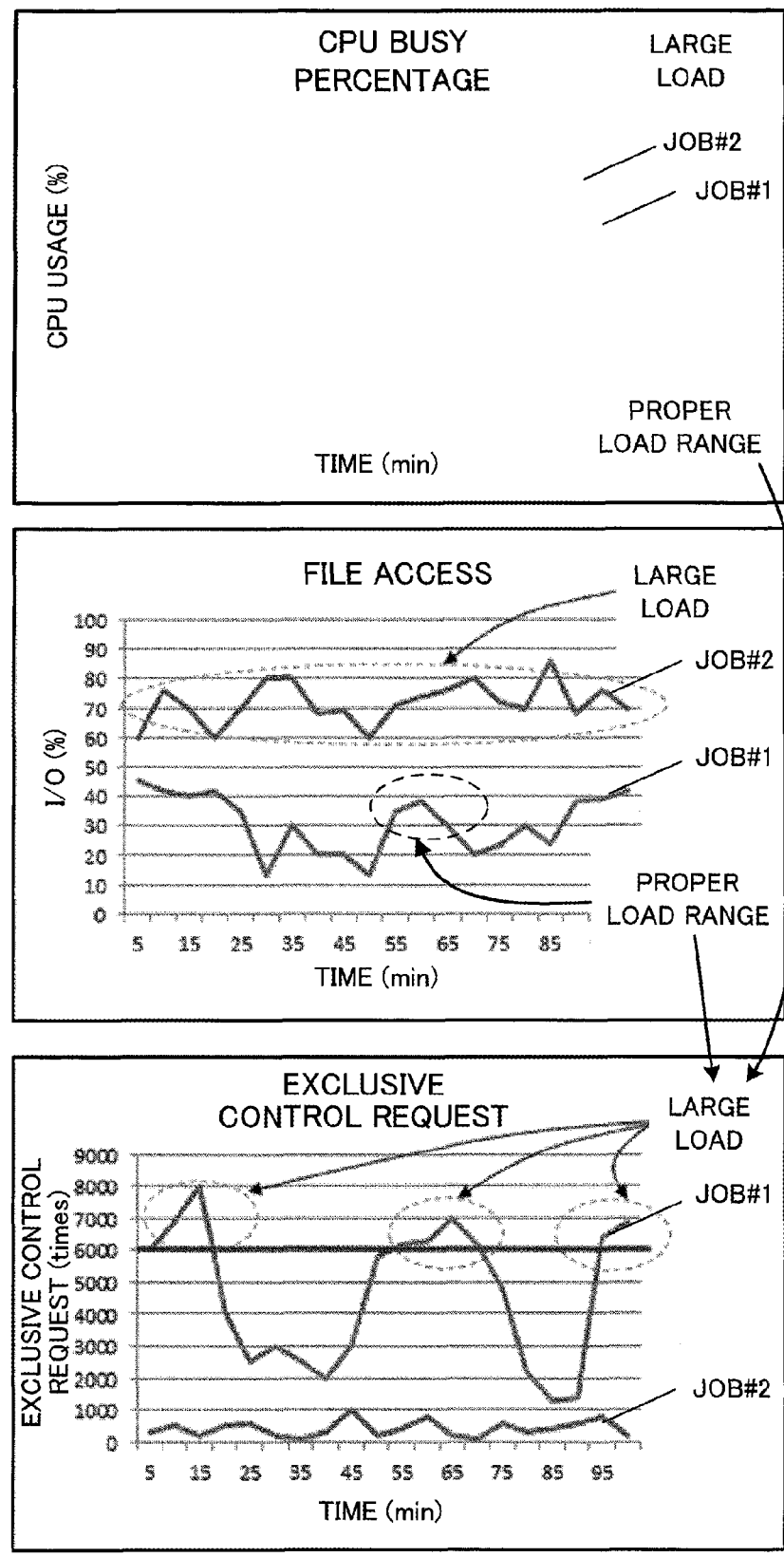
FIG. 2 illustrates examples of comparisons of changes in the CPU busy percentage, file access, and the number of exclusive control requests over time.

FIG. 2 illustrates examples of comparisons of changes in the CPU busy percentage, file access, and the number of exclusive control requests over time. The graphs in FIG. 2 depict changes in the CPU busy percentage, the file accesses, and the number of exclusive control requests, respectively.

Generally, the number of exclusive control requests of files does not correspond to the processing load of the CPU or the load of file access. The CPU load is represented by the CPU busy percentage, for example. The load of file access is represented by the ratio of the amount of data that is actually input and output to the maximum performance of file access (for example, the maximum amount of data that may be input and output per unit time), for instance.

For example, FIG. 2 illustrates changes in load over time in the case of a process (JOB #1) that involves a small amount of file access and handles a large number of small files, and the case of a process (JOB #2) that involves a large amount of file access and handles large files. As illustrated in FIG. 2, each of the load of processing exclusive control requests of files, the processing load of the CPU and the like, and the load of file access differs between the processes. For example, in the case of JOB #1, even when the CPU usage and the load of file access are within a proper range, there are time slots with an excessively large number of exclusive control requests. In contrast, in the case of JOB #2, although the CPU busy percentage and the load of file access are excessive, the number of exclusive control requests is small.

In this way, the CPU busy percentage and the utilization of file access do not always correspond to the number of exclusive control requests of files. Therefore, even if an attempt is made to evenly distribute exclusive control requests by determining the imbalance due to the CPU utilization (load), the actual load of file exclusive control request might be imbalanced.

In the first embodiment, the number of exclusive control requests to be actually made is calculated in advance, and the amount of the load of exclusive control that is to be performed is determined based on the calculated number of exclusive control requests. Therefore, the load of exclusive control is appropriately determined. For example, in the first embodiment, the process execution period is divided into a plurality of unit time slots. Then, in the case where the number of exclusive control requests of files that are made in a unit time slot is greater than a predetermined number of exclusive control requests, the destinations of the exclusive control requests of files in the unit time slot may be changed. This makes it possible to appropriately determine in which time slot the load of exclusive control request becomes excessive, and thus to appropriately distribute the exclusive control requests in that time slot. For example, in the case JOB #1 of FIG. 2, it is possible to appropriately distribute exclusive control requests to the destinations, in the time slots in which the number of exclusive control requests is greater than 6,000.

Further, in the first embodiment, files that are the subjects of exclusive control in a time slot in which there are more than a predetermined number of exclusive control requests are specified, and the destinations of exclusive control requests of the specified files are determined. Accordingly, it is possible to reduce the number of exclusive control requests that are transmitted to each of the plurality of file management server in a predetermined time slot to a predetermined value or less whenever possible.

Note that each of the file management servers 2 and 3, the execution servers 4, 5, and 6, and the management server 7 are computers each including a processor and a memory, for example. In this case, a program describing processing that is implemented by the file management servers 2 and 3, the execution servers 4, 5, and 6, and the management server 7 is provided.

The lines connecting the components of FIG. 1 represent some of communication paths. Communication paths other than those of FIG. 1 may be provided.

(b) Second Embodiment

Next, a description will be given of a second embodiment. Note that, in the second embodiment, a unit of process that is executed by an execution server is referred to as a "job".

Figure 3:
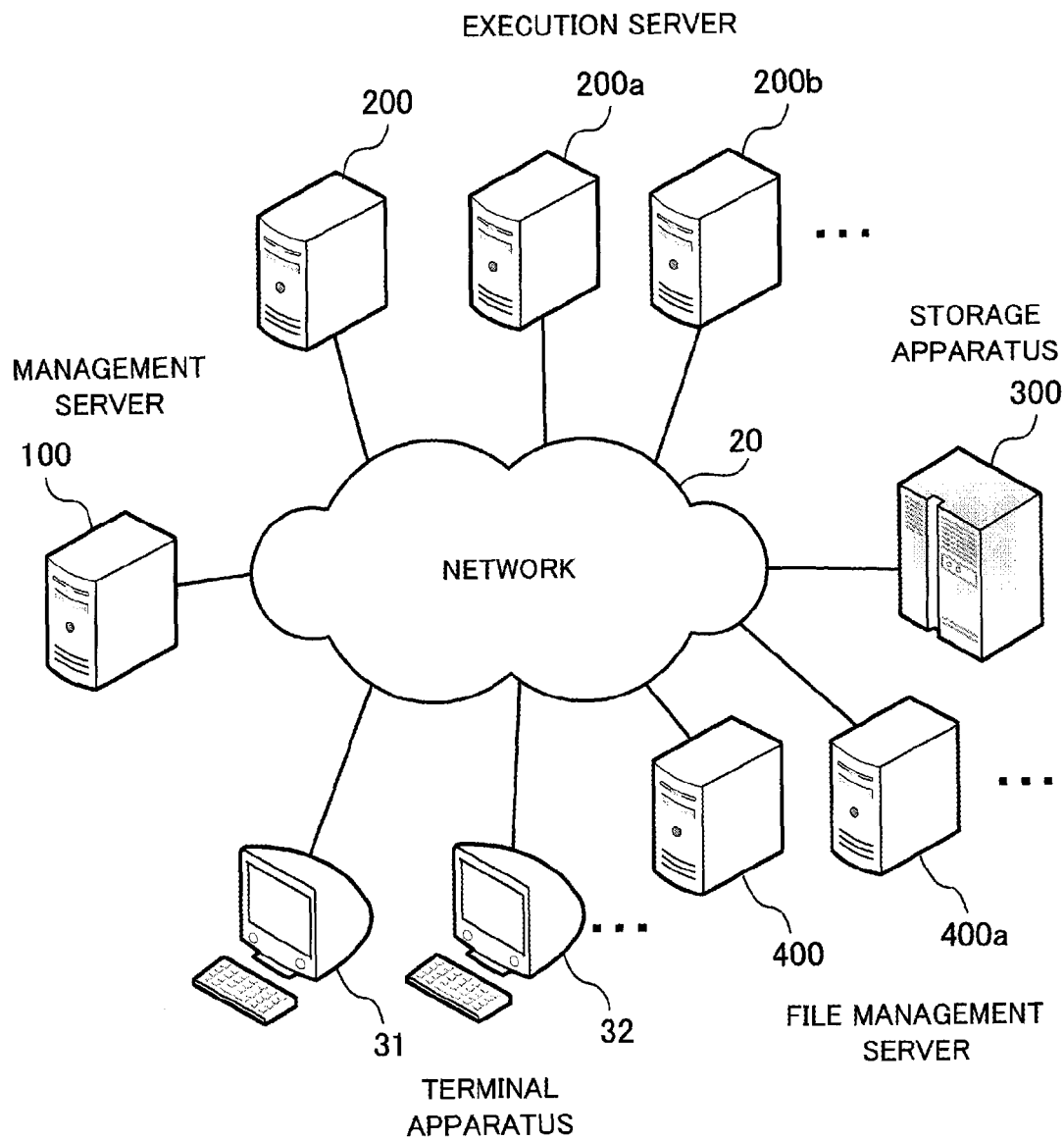
FIG. 3 illustrates an exemplary system configuration according to a second embodiment.

FIG. 3 illustrates an exemplary system configuration according to a second embodiment. In the second embodiment, a management server 100, a plurality of execution servers 200, 200a, 200b, and so on, a storage apparatus 300, file management servers 400, 400a, and so on, and terminal apparatuses 31, 32, and so on are connected via a network 20.

The management server 100 is a computer that manages jobs that are executed. For example, the management server 100 performs scheduling of jobs, and determines the execution period of each job. Then, when the execution start time of a job comes, the management server 100 transmits an execution instruction of the job to any one of the execution servers. When transmitting execution instructions of jobs, the management server 100 performs load distribution processing, for example, and thus allocates execution instructions of jobs such that the load is evenly distributed among the execution servers.

Further, the management server 100 determines file management servers that perform exclusive control of respective files such that the load of exclusive control is evenly distributed among the file management servers 400, 400a, and so on. For example, the management server 100 specifies files that are used by jobs to be executed in a predetermined time period, and determines file management servers that perform exclusive control of the respective files such that the load of exclusive control of the files are evenly distributed. The management server 100 is capable of dynamically changing the designation of file management servers that perform exclusive control of the respective files at predetermined intervals. Then, the management server 100 transmits, to each of the execution servers 200, 200a, 200b, and so on, information indicating which of the file management servers 400, 400a, and so on is requested to perform exclusive control of the files that are used for executing the jobs.

The execution servers 200, 200a, 200b, and so on are computers that execute jobs. For example, an application program used for executing jobs is installed in each of the execution servers 200, 200a, 200b, and so on. Then, in response to an execution request of a job, each of the execution servers 200, 200a, 200b, and so on executes the job using the application program. Functions realized by each of the execution servers 200, 200a, 200b, and so on by executing the application program are hereinafter simply referred to as an "application".

The storage apparatus 300 stores files that are used for executing jobs. For example, the storage apparatus 300 stores several thousands to several tens of thousands of files. The storage apparatus 300 may be a hard disk drive (HDD) or a solid state drive (SSD), for example. Further, the storage apparatus 300 may be a disk array such as a redundant array of inexpensive disks (RAID).

The file management servers 400, 400a, and so on perform exclusive control of files stored in the storage apparatus 300. For example, in accordance with a request for exclusion acquisition of a file from any one of the execution servers, each of the file management servers 400, 400a, and so on places the file in a state of exclusive use by a job in the execution server. The file in the exclusive use state is prevented from receiving access involving update, from jobs other than the job using the file exclusively. Further, in accordance with a request for exclusion release of a file from any one of the execution servers, each of the file management servers 400, 400a, and so on releases the file from the exclusive use state. The file released from the exclusive use state is allowed to be updated by any job.

The terminal apparatuses 31, 32, and so on are computers used by users. For example, the users transmit information indicating a job to be executed, to the management server 100 through the terminal apparatuses 31, 32, and so on.

Figure 4:
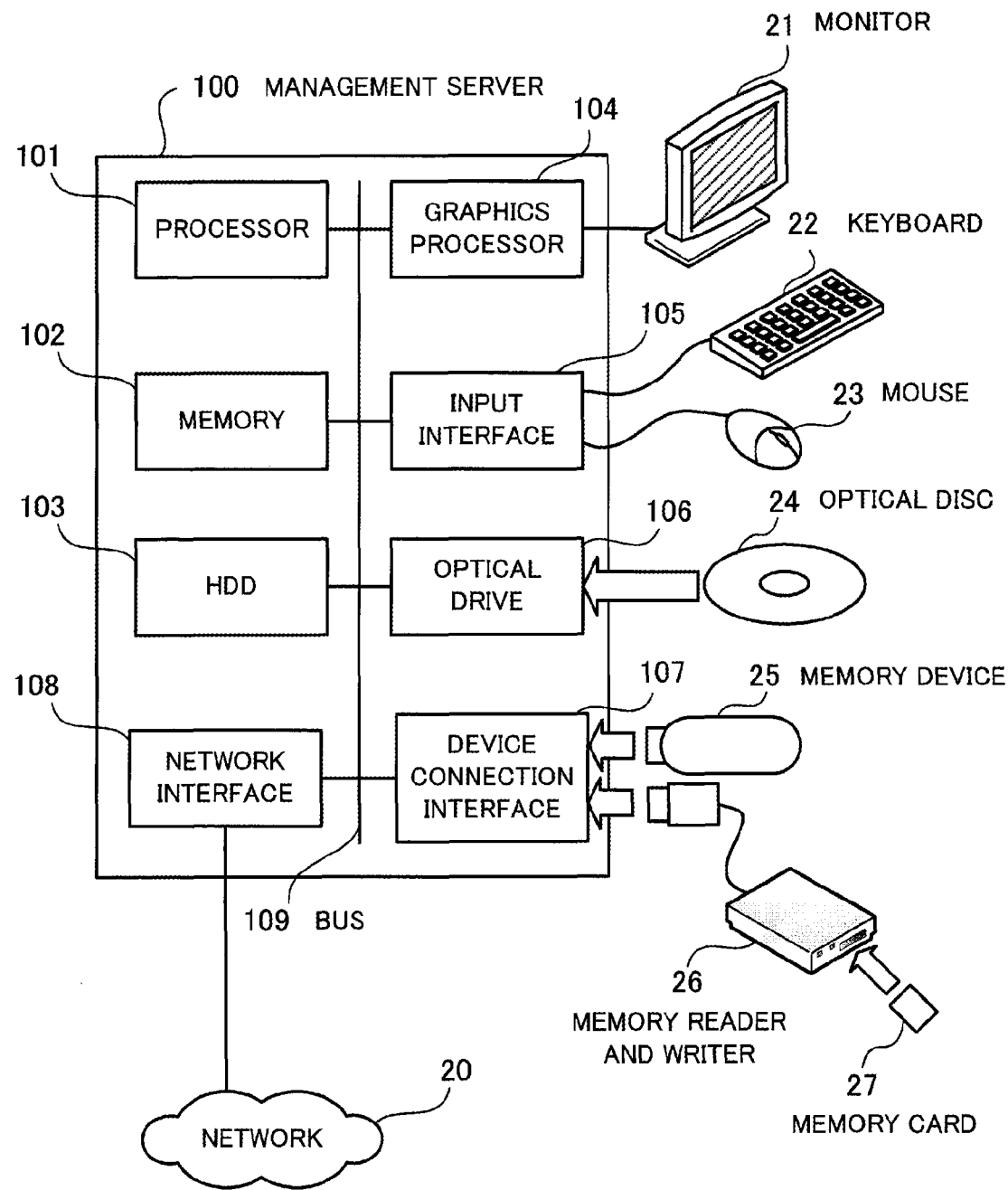
FIG. 4 illustrates an exemplary hardware configuration of a management server.

FIG. 4 illustrates an exemplary hardware configuration of the management server 100. The entire operation of the management server 100 is controlled by a processor 101. A memory 102 and a plurality of peripheral devices are connected to the processor 101 via a bus 109. The processor 101 may be a multiprocessor. Examples of the processor 101 include a CPU, a micro processing unit (MPU), and a digital signal processor (DSP). The functions of the processor 101 may be implemented wholly or partly by using electronic circuits such as an application-specific integrated circuit (ASIC), a programmable logic device (PLD), and the like.

The memory 102 is used as a primary storage device of the management server 100. The memory 102 temporarily stores at least part of the operating system (OS) program and application programs that are executed by the processor 101. The memory 102 also stores various types of data used for processing performed by the processor 101. The memory 102 may be a volatile semiconductor storage device such as a random access memory (RAM) and the like, for example.

The peripheral devices connected to the bus 109 include an HDD 103, a graphics processor 104, an input interface 105, an optical drive 106, a device connection interface 107, and a network interface 108.

The HDD 103 magnetically writes data to and reads data from its internal disk. The HDD 103 serves as a secondary storage device of the management server 100. The HDD 103 stores the OS program, application programs, and various types of data. Note that a non-volatile semiconductor storage device such as a flash memory and the like may be used as a secondary storage device.

A monitor 21 is connected to the graphics processor 104. The graphics processor 104 displays an image on the screen of the monitor 21 in accordance with a command from the processor 101. Examples of the monitor 21 include a display device using a cathode ray tube (CRT), a liquid crystal display device, and the like.

A keyboard 22 and a mouse 23 are connected to the input interface 105. The input interface 105 receives signals from the keyboard 22 and the mouse 23, and transmits the received signals to the processor 101. The mouse 23 is an example of a pointing device, and other types of pointing devices may also be used. Examples of other types of pointing devices include a touch panel, a tablet, a touch pad, a track ball, and the like.

The optical drive 106 reads data from an optical disc 24 by using laser beams or the like. The optical disc 24 is a portable storage medium and stores data such that the data may be read through optical reflection. Examples of the optical disc 24 include digital versatile disc (DVD), DVD-RAM, compact disc read only memory (CD-ROM), CD-Recordable (CD-R), CD-Rewritable (CD-RW), and the like.

The device connection interface 107 is a communication interface that connects peripheral devices to the management server 100. For example, a memory device 25 and a memory reader and writer 26 may be connected to the device connection interface 107. The memory device 25 is a recording medium having a function to communicate with the device connection interface 107. The memory reader and writer 26 is a device that writes data to and reads data from a memory card 27. The memory card 27 is a card-type recording medium.

The network interface 108 is connected to the network 20. The network interface 108 exchanges data with other computers or communication apparatuses via the network 20.

With the hardware configuration described above, it is possible to realize the processing functions of the management server 100. Although the hardware configuration of the management server 100 is illustrated in FIG. 4, the execution servers 200, 200a, 200b, and so on and the file management servers 400, 400a, and so on may be realized with the same hardware configuration. Further, the apparatus of the first embodiment may be realized with the same hardware configuration as the management server 100 of FIG. 4.

Each of the management server 100, the execution servers 200, 200a, 200b, and so on, and the file management servers 400, 400a, and so on realizes the processing functions of the second embodiment by executing a program stored in a computer-readable recording medium, for example. The program describing the procedure to be performed by each server may be stored in various recording media. For example, the program to be executed by each server may be stored in the HDD. The processor of each server loads at least part of the program from the HDD into the memory so as to execute the program. The program to be executed by each server may also be stored in a portable recording medium, such as optical disc, memory device, memory card, and the like. The program stored in the portable recording medium may be executed after being installed into the HDD under the control of the processor, for example. Further, the processor may execute the program by reading the program directly from the portable recording medium.

Figure 5:
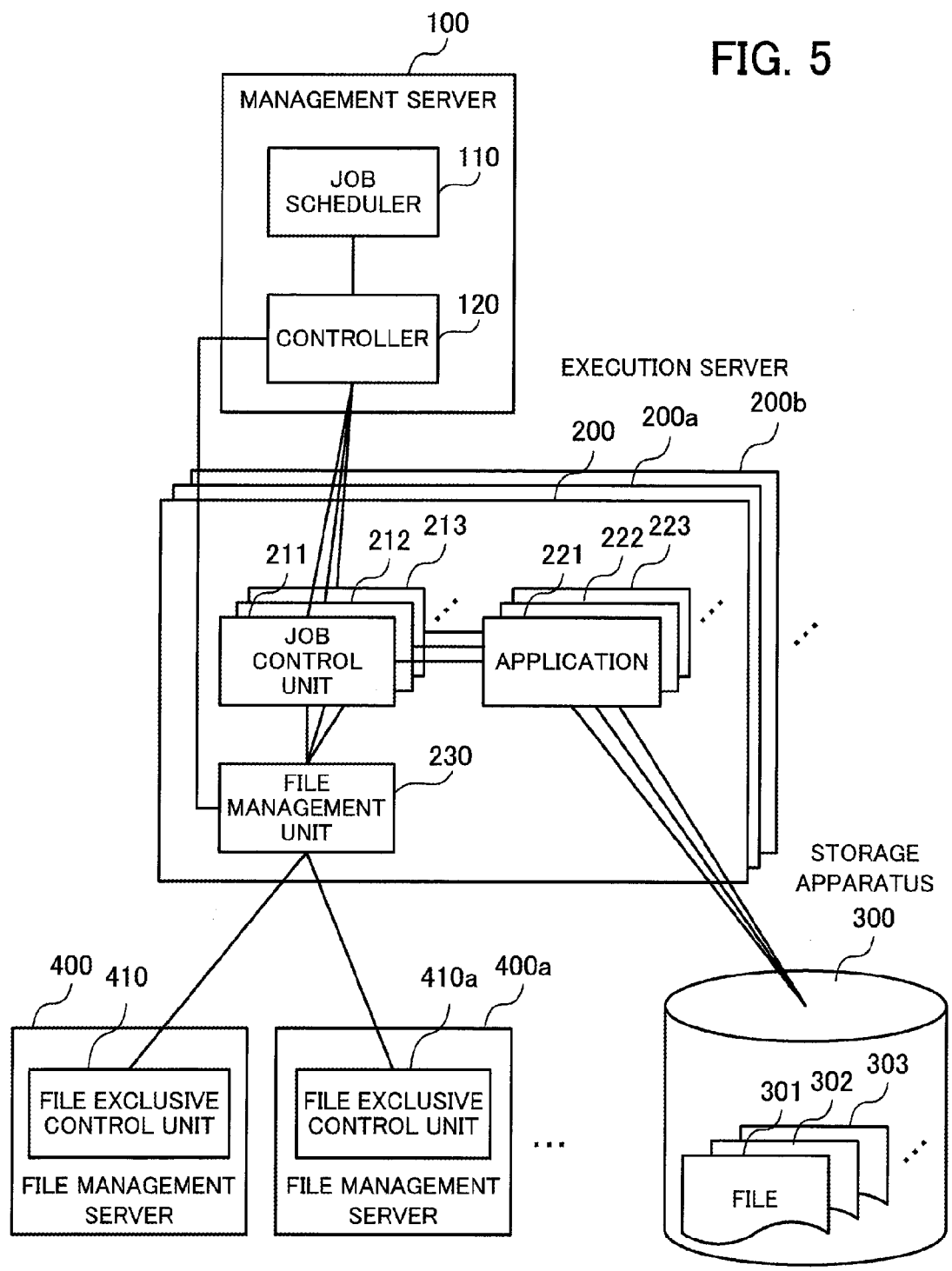
FIG. 5 is a block diagram illustrating examples of functions of apparatuses.

FIG. 5 is a block diagram illustrating examples of functions of the apparatuses. The management server 100 includes a job scheduler 110 and a controller 120.

The job scheduler 110 performs scheduling of the job execution time. For example, the job scheduler 110 determines the execution time of each job and an execution server that executes each job such that batch jobs that are executed in a predetermined time period are evenly distributed among and executed by the plurality of execution servers 200, 200a, 200b, and so on.

The controller 120 transmits an execution instruction of a job to an execution server that executes the job, in accordance with the execution schedule determined by the job scheduler 110. Further, the controller 120 determines a file management server that performs exclusive control of each of files 301, 302, 303, and so on stored in the storage apparatus 300, in accordance with the execution schedule determined by the job scheduler 110. Then, the controller 120 delivers a shared-file definition indicating a file management server that performs exclusive control of each of the files 301, 302, 303, and so on, to the execution servers 200, 200a, 200b, and so on.

The execution server 200 includes a plurality of job control units 211, 212, 213, and so on, a plurality of applications 221, 222, 223, and so on, and a file management unit 230. The job control units 211, 212, 213, and so on start the applications 221, 222, 223, and so on, respectively, so as to execute a job, in accordance with an execution instruction of a job from the management server 100. Further, the job control units 211, 212, 213, and so on transmit an exclusive control request of a file used by a job to be executed to the file management unit 230. The other execution servers 200a, 200b, and so on have the same functions as the execution server 200.

The applications 221, 222, 223, and so on execute a job assigned by the job control units 211, 212, 213, and so on, respectively. Note that the applications 221, 222, 223, and so on access a file in the storage apparatus 300, when executing the job.

The file management unit 230 transmits exclusive control requests from the job control units 211, 212, 213, and so on to the file management servers 400, 400a, and so on. For example, the file management unit 230 acquires the shared-file definition transmitted from the management server 100. The file management unit 230 determines file management servers as the destinations of the exclusive control requests, in accordance with the shared-file definition.

The file management servers 400, 400a, and so on include file exclusive control units 410, 410a, and so on, respectively. Each of the file exclusive control units 410, 410a, and so on performs exclusive control of a file, in response to an exclusive control request.

Since each apparatus has the function described above, exclusive control of files is distributed to and processed by a plurality of file management servers 400, 400a, and so on. Note that the lines connecting the components in FIG. 5 represent some of communication paths. Communication paths other than those of FIG. 10 may be provided.

Figure 6:
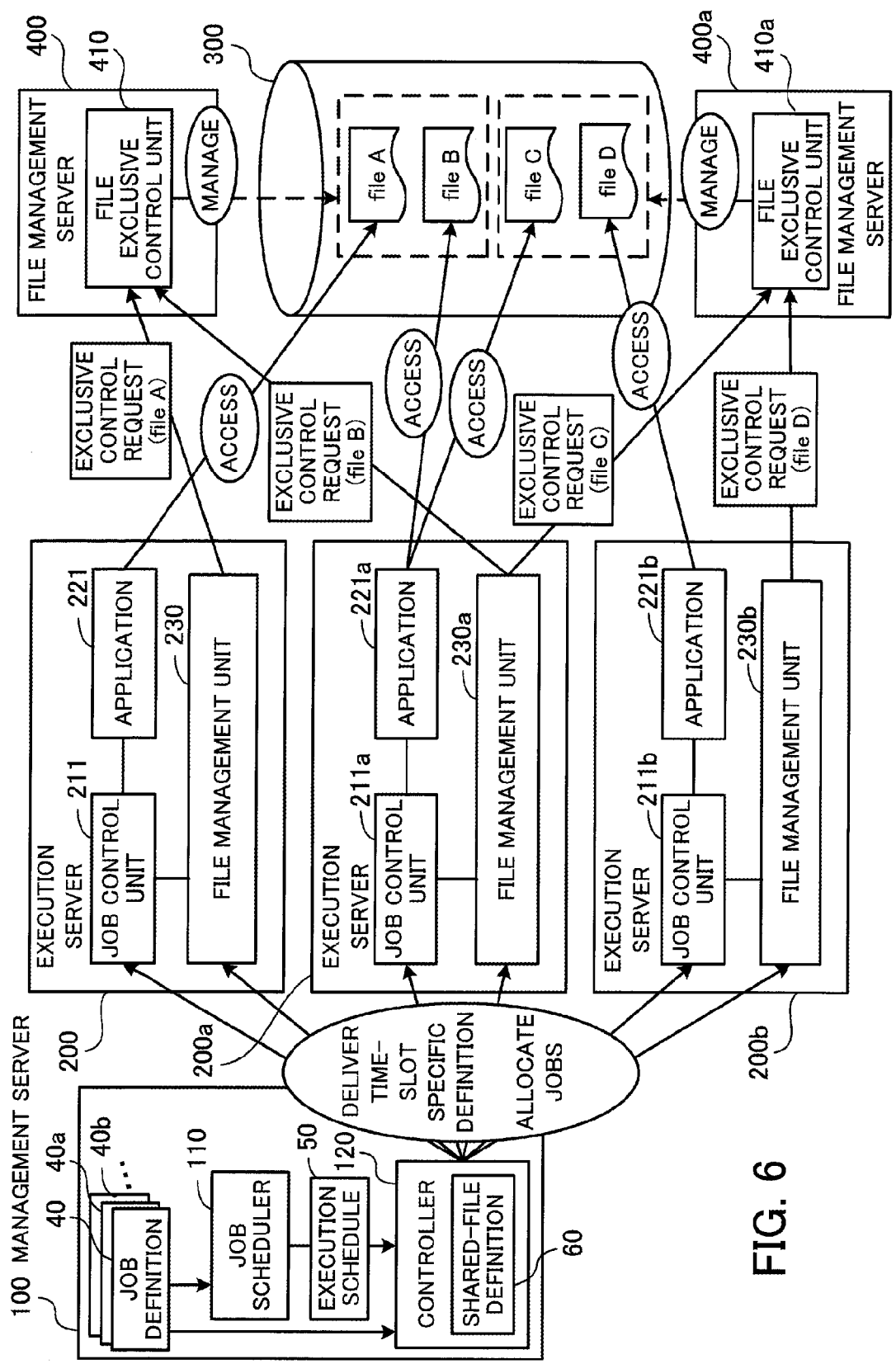
FIG. 6 illustrates an example of distributed processing of exclusive control of files.

FIG. 6 illustrates an example of distributed processing of exclusive control of files. In the example of FIG. 6, three execution servers 200, 200a, and 200b and two file management servers 400 and 400a are provided. However, there may be provided four or more execution servers and three or more file management servers.

In the management server 100, the job scheduler 110 creates an execution schedule 50 indicating an execution schedule of jobs, based on job definitions 40, 40a, 40b, and so on, for jobs to be executed in a predetermined time period. The controller 120 creates a shared-file definition 60, based on the created execution schedule 50, and the job definitions 40, 40a, 40b, and so on. The shared-file definition 60 defines the allocation of files managed by the respective file management servers 400 and 400a, in each predetermined time slot. When the start time of a time slot specified in the shared-file definition 60 comes, the controller 120 transmits a time-slot specific definition of this time slot to the execution servers 200, 200a, and 200b. The transmitted time-slot specific definition is received by the file management units 230, 230a, and 230b of the respective execution servers 200, 200a, and 200b. The file management units 230, 230a, and 230b store the time-slot specific definition in storage media, such as internal memories, and wait for exclusive control requests of files from the job control units 211, 211a, and 211b. In the example of FIG. 6, among the files in the storage apparatus 300, a "file A" and a "file B" are managed by the file management server 400, and a "file C" and a "file D" are managed by the file management server 400a.

Subsequently, the controller 120 of the management server 100 transmits execution instructions of jobs whose start time has come to the execution servers 200, 200a, and 200b. In the execution servers 200, 200a, and 200b, the job control units 211, 211a, and 211b receive the execution instructions of the jobs. Then, the job control units 211, 211a, and 211b transmit exclusive control requests for exclusion acquisition of files used by the jobs to be executed to the file management units 230, 230a, and 230b. The file management units 230, 230a, and 230b having received the exclusive control requests for exclusion acquisition determine a file management server that performs exclusive control, for each of the files that are the subjects of exclusive control, by referring to the time-slot specific definition having been received in advance. Then, the file management units 230, 230a, and 230b transmit exclusive control requests for exclusion acquisition to the file management servers that perform exclusive control of the files.

In the example of FIG. 6, the "file A" is used by a job that is executed by the application 221 of the execution server 200. The "file B" and the "file C" are used by a job that is executed by the application 221a of the execution server 200a. The "file D" is used by a job that is executed by the application 221b of the execution server 200b. In this case, the file management unit 230 of the execution server 200 transmits an exclusive control request for exclusion acquisition of the "file A" to the file management server 400 that manages the "file A". The file management unit 230a of the execution server 200a transmits an exclusive control request for exclusion acquisition of the "file B" to the file management server 400 that manages the "file B". Further, the file management unit 230a transmits an exclusive control request for exclusion acquisition of the "file C" to the file management server 400a that manages the "file C". The file management unit 230b of the execution server 200b transmits an exclusive control request for exclusion acquisition of the "file D" to the file management server 400a that manages the "file D".

Subsequently, the job control units 211, 211a, and 211b of the respective execution servers 200, 200a, and 200b start the applications 221, 221a, and 221b, respectively, in accordance with the execution intrusions of jobs. Then, the job control units 211, 211a, and 211b cause the started applications 221, 221a, and 221b to execute jobs in accordance with the instructions. The applications 221, 221a, and 221b execute the assigned jobs. While executing the jobs, the applications 221, 221a, and 221b access files in the storage apparatus 300, and update the contents of the files, for example.

In this way, the load of exclusive control of files is distributed. Note that in the second embodiment, the management server 100 creates a shared-file definition such that the load is evenly distributed among the file management servers 400, 400a, and so on, for each predetermined time slot, using information on files that are used by the jobs to be executed in that time slot. The files used by the respective jobs are indicated by the job definitions 40, 40a, 40b, and so on.

Figure 7:
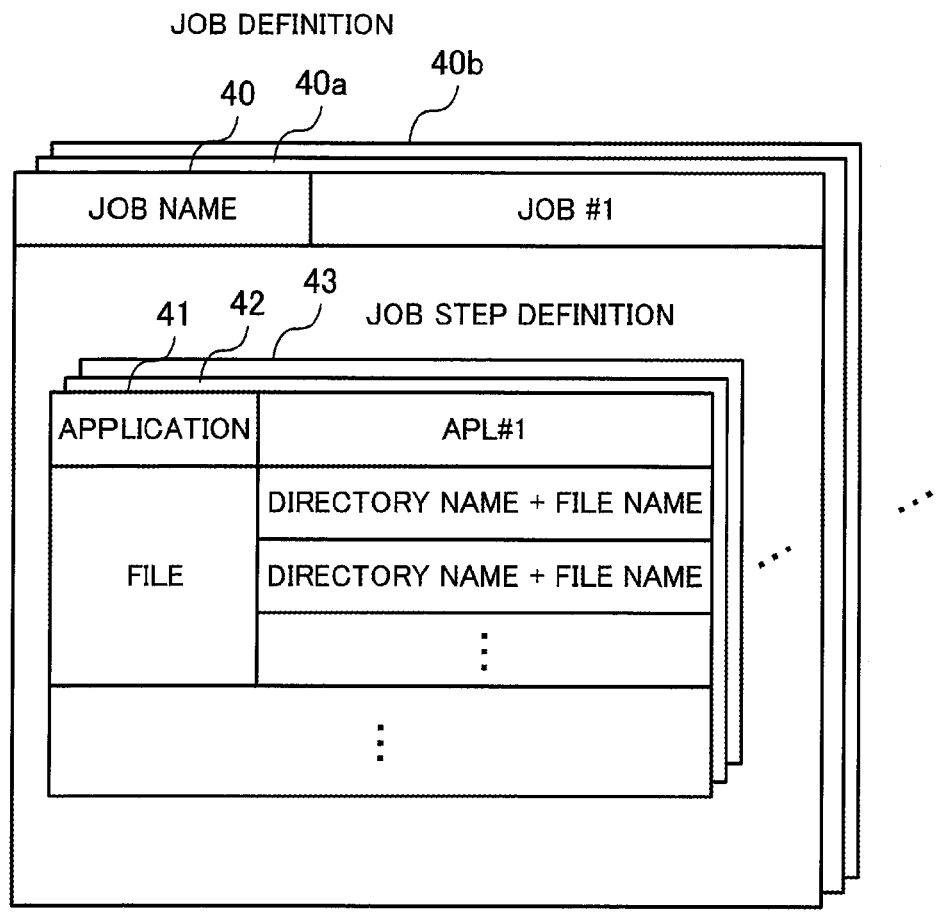
FIG. 7 illustrates an example of a job definition.

FIG. 7 illustrates an example of a job definition. Each of the job definitions 40, 40a, 40b, and so on that are provided for the respective jobs includes a job name. Each of the job definitions 40, 40a, 40b, and so on includes a plurality of job step definitions 41, 42, 43, and so on. The job step definitions 41, 42, 43, and so on define the processing of the respective steps that are executed in the job. Each of the job step definitions 41, 42, 43, and so on specifies an application and one or more files that are used for executing the job. Further, the job step definitions 41, 42, 43, and so on may include various types of parameters that are specified when executing the application, for example. The job definitions 40, 40a, 40b, and so on with the contents described above are an example of the utilization file information 7b of the first embodiment of FIG. 1.

Note that the job definitions 40, 40a, 40b, and so on are input in advance from the terminal apparatuses 31, 32, and so on to the management server 100. It is possible to confirm the content of jobs to be executed, based on these job definitions 40, 40a, 40b, and so on. Thus, the job scheduler 110 creates the execution schedule 50 such that the load is evenly distributed among the execution servers 200, 200a, and 200b.

Figure 8:
FIG. 8 illustrates an example of an execution schedule.

FIG. 8 illustrates an example of the execution schedule 50. The created execution schedule 50 includes, in association with the job name of each job, an execution server that executes the job, the start time of the job, and the end time of the job.

The shared-file definition 60 is generated based on the job definitions 40, 40a, 40b, and so on illustrated in FIG. 7 and the execution schedule 50 illustrated in FIG. 8.

Figure 9:
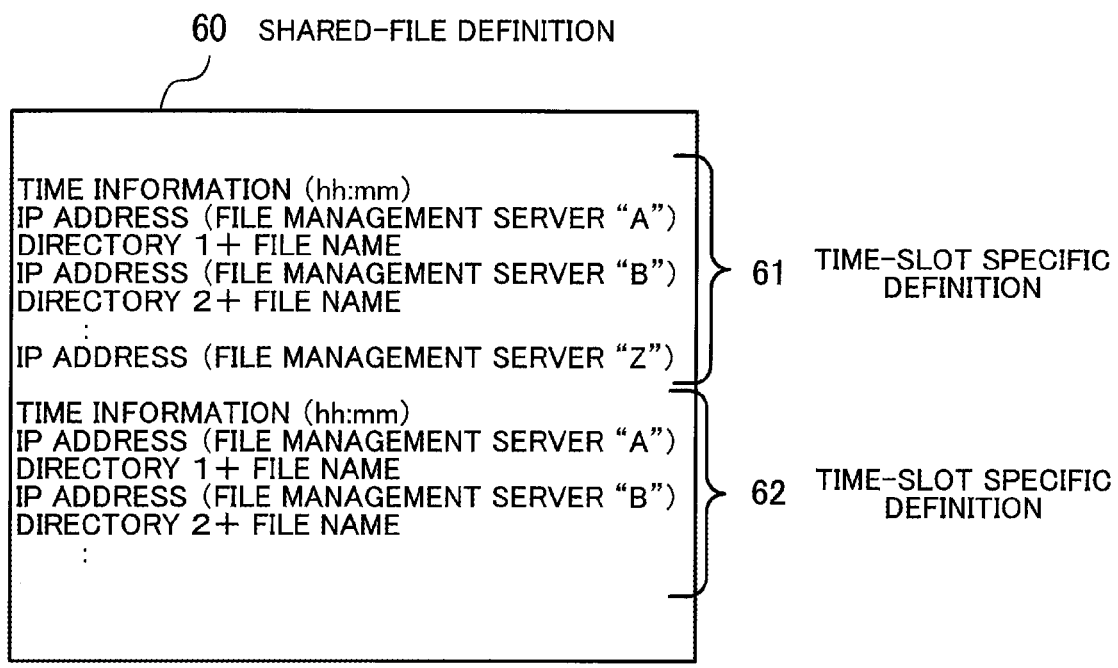
FIG. 9 illustrates an exemplary configuration of a shared-file definition.

FIG. 9 illustrates an exemplary configuration of the shared-file definition 60. The shared-file definition 60 includes a plurality of time-slot specific definitions 61, 62, and so on. Each of the time-slot specific definitions 61, 62, and so on includes time information. The time information indicates the time to change the time-slot specific definition to be applied. In other words, the time information indicates the start time of the time slot to which the time-slot specific definition provided therebelow is applied.

Under the time information, the IP addresses of file management servers and "directory name+file name" are alternately arranged. The "directory name+file name" is used as a criteria for determining a file management server that manages a file.

Figure 10:
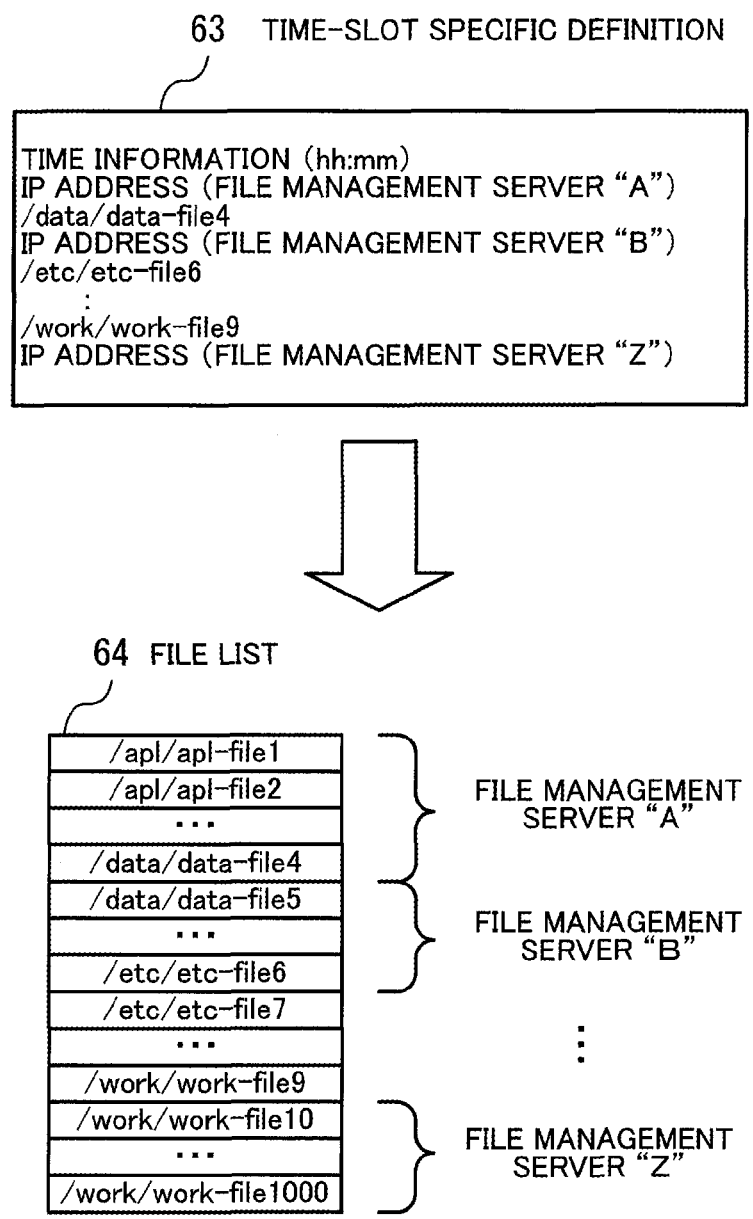
FIG. 10 illustrates an example of defining files managed by each file management server.

FIG. 10 illustrates an example of defining files managed by a file management server. For example, a list of files in the storage apparatus 300 is sorted by the string of "directory name+file name". Then, a series of files in a predetermined range on the sorted file list 64 are assigned to each file management server as files to be managed.

When sorting by the string, the first characters of the strings are first compared. The less the value of the character code of the compared character of the string is, the higher the string is placed when sorted. In the case where a plurality of strings have the same first character, the subsequent characters are sequentially compared. Then, the values of the character codes of the first different characters encountered are compared. The string having a smaller character code value is placed higher, and the string having a greater character code value is placed lower.

For example, in the case of a file management server corresponding to a certain IP address, the next file of the file corresponding to the "directory name+file name" that is set above the IP address is the first file of a range of files to be managed. Further, the file corresponding to the "directory name+file name" that is set below the IP address is the last file of a range of files to be managed. In the example of FIG. 10, a file management server "B" manages the files from "/data/data-file5" to "/etc/etc-file6" in the file list 64.

If there is no "directory name+file name" above an IP address, the first file of a range of files to be managed by the file management server corresponding to the IP address is the first file in the sorted file list 64. Accordingly, a file management server "A" of FIG. 10 manages the files from "/apl/apl-file1" to "/data/data-file4" in the file list 64.

If there is no "directory name+file name" below an IP address, the last file of a range of files to be managed by the file management server corresponding to the IP address is the last file on the sorted file list 64. Accordingly, a file management server "Z" of FIG. 10 manages the files from "/work/work-file10" to "/work/work-file1000" in the file list 64.

In this way, files managed by each file management server are defined on a per-time-slot basis in the shared-file definition 60. Further, files managed by each of file management servers are determined such that load of exclusive control in each time slot is evenly distributed among the file management servers.

Hereinafter, the processing for generating a shared-file definition will be described in detail.

Figure 11:
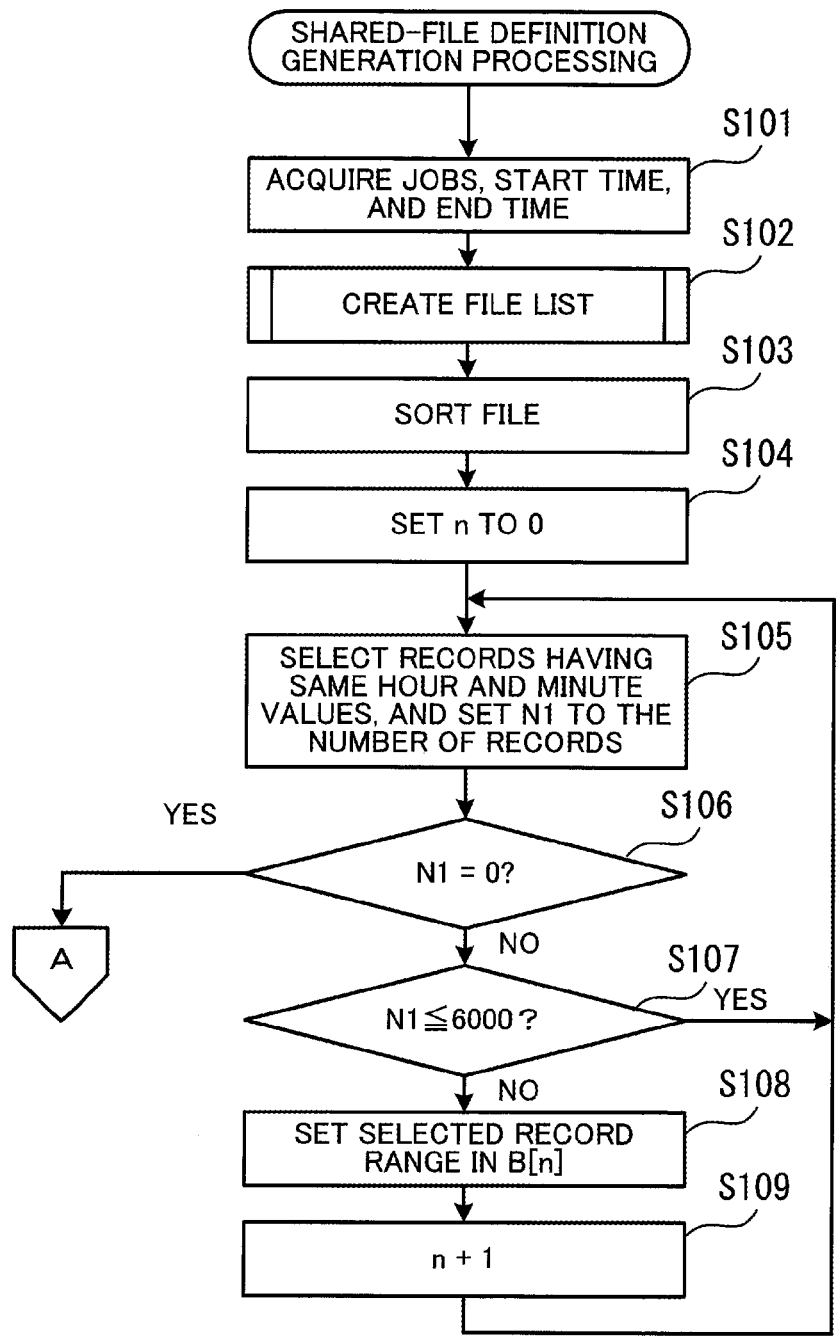
FIG. 11 is the first half of a flowchart illustrating an exemplary procedure of shared-file definition generation processing.

FIG. 11 is the first half of a flowchart illustrating an exemplary procedure of shared-file definition generation processing.

(Step S101) The controller 120 acquires the start time and end time of all the jobs to be executed. For example, the controller 120 receives the execution schedule 50 (see FIG. 8) indicating an execution schedule of all the jobs from the job scheduler 110, and acquires the start time and end time of jobs from the execution schedule 50.

(Step S102) The controller 120 generates a file list. The file list is a list of files that are used by jobs to be executed. The file list may include jobs that execute the respective files and the start time and end time of the jobs, for example. However, information on jobs that do not access the files is not included in the file list. The file list generation processing will be described below in greater detail (see FIG. 13).

(Step S103) The controller 120 divides the record of each file on the file list into a record with the start time of the job that executes the files and a record with the end time of the job that executes the file. Then, the controller 120 sorts the records in the file list by the values of the start time and end time in ascending order.

(Step S104) The controller 120 sets a variable n to "0". The variable n is used as an index of an array B[n] (described below).

(Step S105) The controller 120 selects records having the same hour and minute values as the start time or end time, sequentially from the top of the file list, and sets a variable N1 to the number of records. That is, records having the same time value as the start time or end time when ignoring the values of second, millisecond and so on are selected, and a variable N1 is set to the number of selected records. The value of the variable N1 represents the number of exclusive control requests of files that are executed in the time slot of 1 minute. Note that in the case where the counting of the number of records is completed for all the start times or end times in the file list, the variable N1 is set to 0 without selecting any new record.

(Step S106) The controller 120 determines whether the value of the variable N1 is 0. If the value of the variable N1 is 0, the counting of the number of records in the same time slot is completed for all the start times or end times in the file list. When the value of the variable N1 is 0, the process proceeds to step S121 (see FIG. 15). When the value of the variable N1 is not 0, the process proceeds to step S107.

(Step S107) The controller 120 determines whether the value of the variable N1 is equal to or less than 6,000. When the value of the variable N1 is equal to or less than 6,000, the process returns to step S105. When the value of the variable N1 is greater than 6,000, the process proceeds to step S108.

(Step S108) The controller 120 sets a range of records selected in step S105 in the array B[n]. The selected range of records is represented by a combination of the position of the first record of the selected records and the number of records (which is set in the variable N1) whose time is set in the same time slot as that record, for example.

(Step S109) The controller 120 adds 1 to the value of the variable n, and the process returns to step S105.

In this way, the point where there is a burst of exclusive control requests of files occurs in the same time slot is calculated, based on the information stored in the file list. In the example of FIG. 11, the number of records whose start times or end times are set in the same time slot is counted, for each 1-minute time slot. The start time or end time of each record indicates the output time of an exclusive control request for exclusion acquisition or exclusion release of the file indicated by the record. Accordingly, in the file list, the number of records whose start times or end times are in a predetermined time slot represents the number of exclusive control requests that are made in this time slot.

Then, if the number of exclusive control requests that occur in a certain time slot is greater than a predetermined number of exclusive control requests, a burst of exclusive control requests is determined to occur in this time slot. In the example of FIG. 11, when the number of exclusive control requests in a 1-minute time interval is greater than 6,000, a concentration of processing is determined to occur (step S107). The value 6,000 is the maximum number of exclusive control requests per minute that one file management server is able to process without becoming a bottleneck. This value is calculated in the following way.

As in the case of online processing, the Transmission Control Protocol/Internet Protocol (TCP/IP) may be used for file management processing. It is now assumed that the transaction per second (TPS) is about 1,000. Then, supposing that 10% of the CPU capacity is used for exclusive control, resources for 100 transactions are assigned for performing exclusive control. Accordingly, it is possible to process 100 exclusive control requests per second, that is, 6,000 exclusive control requests per minute.

As for the time slot with 6,000 exclusive control requests or greater, as illustrated in step S108, a range of records whose start times or end times are set in that time slot are set in the array B[n]. Information in the array B[n] is used for generating a time-slot specific definition in the shared-file definition.

On the other hand, as for the time slot with less than 6,000 exclusive control requests, even if there is a burst of exclusive control requests on one file management server, the server does not become a bottleneck. In this case, the determination in step S107 is "YES", and the processing of step S108 is not performed. As a result, the range of records in the time slot with less than 6,000 exclusive control requests is not set in the array B[n], and time-slot specific definition for this time slot is not generated. In this way, as for the time slot in which a bottleneck due to exclusive control requests is determined not to occur, the immediately preceding time-slot specific definition that has been applied is applied continuously, for example.

Next, the file list creation processing of step S102 will be described in detail.

Figure 12:
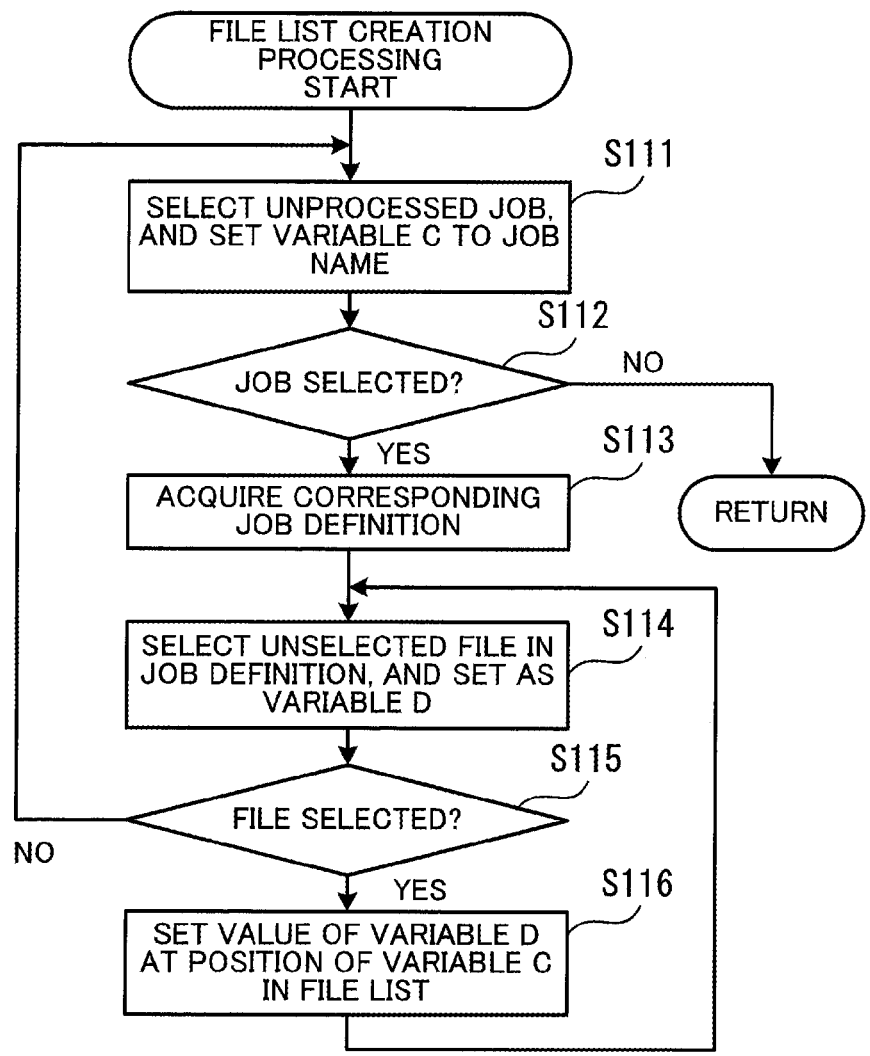
FIG. 12 is a flowchart illustrating an exemplary procedure of file list creation processing.

FIG. 12 is a flowchart illustrating an exemplary procedure of file list creation processing.

(Step S111) The controller 120 selects an unprocessed job from among the jobs that are executed a day from the execution schedule 50, and sets a variable C to the job name of the selected job.

(Step S112) The controller 120 determines whether a job is selected in step S111. For example, in the case where processing on all the jobs in the execution schedule 50 is completed, no job is selected in step S111. If no job is selected, the file list creation processing ends. If a job is selected, the process proceeds to step S113.

(Step S113) The controller 120 acquires a job definition corresponding to the job name. For example, the management server 100 stores job definitions that are input in advance in the memory 102. Then, the controller 120 acquires a job definition in which the acquired job name is set from the memory 102.

(Step S114) The controller 120 selects an unselected file from among the files in the acquired job definition, and sets a variable D to the "directory name+file name" of the selected file.

(Step S115) The controller 120 determines whether a file is selected in step S114. For example, once all the files in the acquired job definition are selected, no file is selected in step S114. If a file is not selected, the process returns to step S111. If a file is selected, the process proceeds to step S116.

(Step S116) The controller 120 sets the job name that is set in the variable C and the "directory name+file name" that is set in the variable D in the file list. Further, the controller 120 acquires the start time and end time of the job indicated by the variable C from the execution schedule 50. Then, the controller 120 sets the acquired start time and end time in association with the job name represented by the variable C, in the file list. Subsequently, the process returns to step S114.

In this way, a file list as a list of files that are used by the respective jobs to be executed is created.

FIG. 13 illustrates an example of a file list 64. The file list 64 includes the job name, directory name, file name, start time, and end time. The job name is the name of the job to be executed. The directory name is the name of the directory storing a file that is used by the job to be executed. The file name is the name of the file that is used by the job to be executed. The start time is the start time of the job. At the start time of the job, an exclusive control request for exclusion acquisition of the file that is used by the job is output. The end time is the end time of the job. At the end time of the job, an exclusive control request for exclusion release of the file that is used by the job is output.

Each record of the created file list 64 is divided into a record with the start time but without the end time, and a record with the end time but without the start time. Then, the records in the file list 64 are sorted by the time that is set as the start time or the end time.

FIG. 14 illustrates an example of the sorted file list 64. When the records in the file list 64 are sorted by time, the records are arranged in ascending order of time. Then, the number of records having the same time (hour and minute) is counted. In the example of FIG. 14, there are 9,000 records having the time 2:17, and there are 6,000 records having the time 2:20. In the case where the exclusive control is likely to be a bottle neck when more than 6,000 exclusive control requests are output in one minute, the time slot of 2:17 is the subject of optimization of allocation of exclusive control requests. A range of records in the file list 64 corresponding to the time slot that is the subject of optimization of allocation of exclusive control requests is set in the array B[n].

Subsequently, a time-slot specific definition is generated based on the information in the array B[n], and is set in the shared-file definition.

Figure 15:
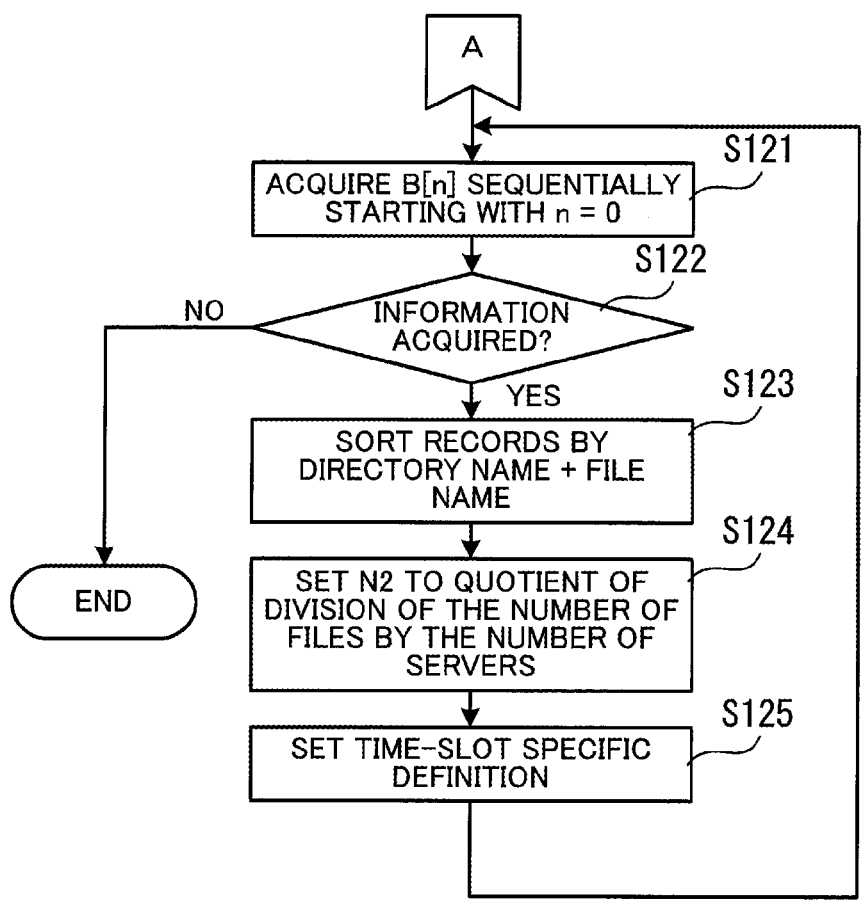
FIG. 15 is the second half of the flowchart illustrating an exemplary procedure of shared-file definition generation processing.

FIG. 15 is the second half of the flowchart illustrating an exemplary procedure of shared-file definition generation processing.

(Step S121) The controller 120 acquires the arrays B[n] sequentially starting with n=0. In the array B[n], the range of records indicating files that are the subjects of exclusive control in a time slot in which a large load is placed on the file management servers is indicated by the variable A and the variable N1. The variable A indicates the position of the first record among the plurality of corresponding records in the file list, and the variable N1 indicates the number of corresponding records. Thus, the controller 120 acquires the same number of records as the number of records indicated by the variable N1 sequentially from the record at the position in the file list indicated by the variable A.

(Step S122) The controller 120 determines whether information in the array B[n] is acquired in step S121. For example, in the case where an element corresponding to n is not registered in the array B[n], no information is acquired in step S121. If no information is acquired, the controller 120 recognizes that processing on all the elements registered in the arrays B[n] is completed. Then, the shared-file definition creation processing ends. If information is acquired, the process proceeds to step S123.

(Step S123) The controller 120 acquires the range of records indicated by the acquired information from the file list, and sorts the records by the "directory name+file name".

(Step S124) The controller 120 sets a variable N2 to the quotient obtained by dividing the number of acquired files by the number of file management servers. Note that in the case where the number of files is indivisible by the number of file management servers, the controller 120 may set the variable N2 to a value obtained by adding 1 to the quotient, for example.

(Step S125) The controller 120 sets the time-slot specific definition based on the acquired records in the shared-file definition. For example, the controller 120 adds the earliest time among the start times and end times in the respective acquired records to the shared-file definition. Then, the controller 120 identifies the N2-th, (N2×2)-th, . . . records from the top of the sorted records, and extracts the directory name and the file name from the identified records. Then the controller 120 adds IP addresses of the file management servers and the acquired "directory name+file name" elements alternately. For example, the controller 120 sets an IP address of a file management server below the time information of the shared-file definition. Then, the controller 120 sets the "directory name+file name" extracted from the N2-th record. After that, the controller 120 performs setting of another IP address, setting of the "directory name+file name" of the (N2×2)-th record", setting of another IP address, and so on. Thus, information is set in the shared-file definition. As a result, a time-slot specific definition based on the array B[n] is added to the shared-file definition. When the addition of the time-slot specific definition is completed, the process returns to step S121. By performing the processing of adding time-slot specific definitions in this way for the elements in the arrays B[n], the shared definition is created.

Note that the controller 120 may set a new time-slot specific definition only when there is no job that runs continuously before and after the earliest time from among the start times and end times that are set in the respective acquired records. A job that runs continuously before and after certain time is a job that is executed before that time and is completed after that time. By setting a new time-slot specific definition only when there is no such job, it is possible to prevent a file management server performing exclusive control of a file from being switched to another file management server while the file is being used exclusively by a certain job.

Note that there may be cases in which a plurality of file management servers operate in conjunction with each other so as to allow the file management server that manages a file under the exclusive control to be changed. In this case, even when there is a job that runs continuously before and after the earliest time from among the start times and end times that are set in the respective acquired records, a time-slot specific definition specifying that time as an application start time may be set.

In this way, the determination of which file management server manages which directory is made, so that the shared-file definition is automatically generated. Hereinafter, an example of generating a time-slot specific definition based on the records of 2:17 of FIG. 14 will be described with reference to FIGS. 16 and 17.

FIG. 16 illustrates the sorted result of records in a time slot in which an excessively large load is placed. From the file list 64 of FIG. 14, records whose start time or end time is in a time slot (one minute of 2:17) in which the load becomes excessive are extracted, and the records are sorted by the string of "directory name+file name". It is now assumed that there are three file management servers. Since there are 9,000 extracted records, 3,000 is obtained by dividing the number of records by the number of file management servers. Then, the 3,000th record 65 and the 6000th record 66 are identified. The identified records 65 and 66 are set as the time-slot specific definition of 2:17 in the shared-file definition.

Figure 17:
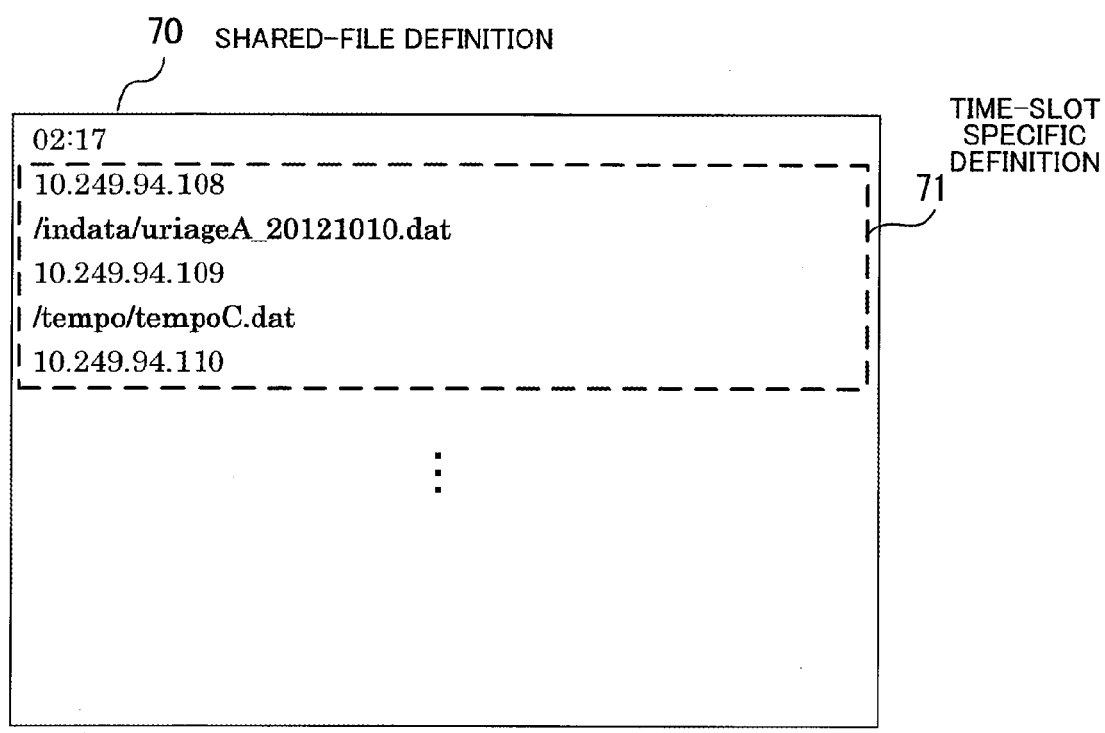
FIG. 17 illustrates an example of a shared-file definition.

FIG. 17 illustrates an example of a shared-file definition. A shared-file definition 70 includes a time-slot specific definition 71 in which the application start time is 2:17. In the time-slot specific definition 71, the "directory name+file name" of each of the identified records 65 and 66 out of the plurality of records of FIG. 16 is inserted between IP addresses of file management servers.

The time-slot specific definition 71 in the shared-file definition 70 is delivered to the execution servers 200, 200a, 200b, and so on when the application start time comes.

Figure 18:
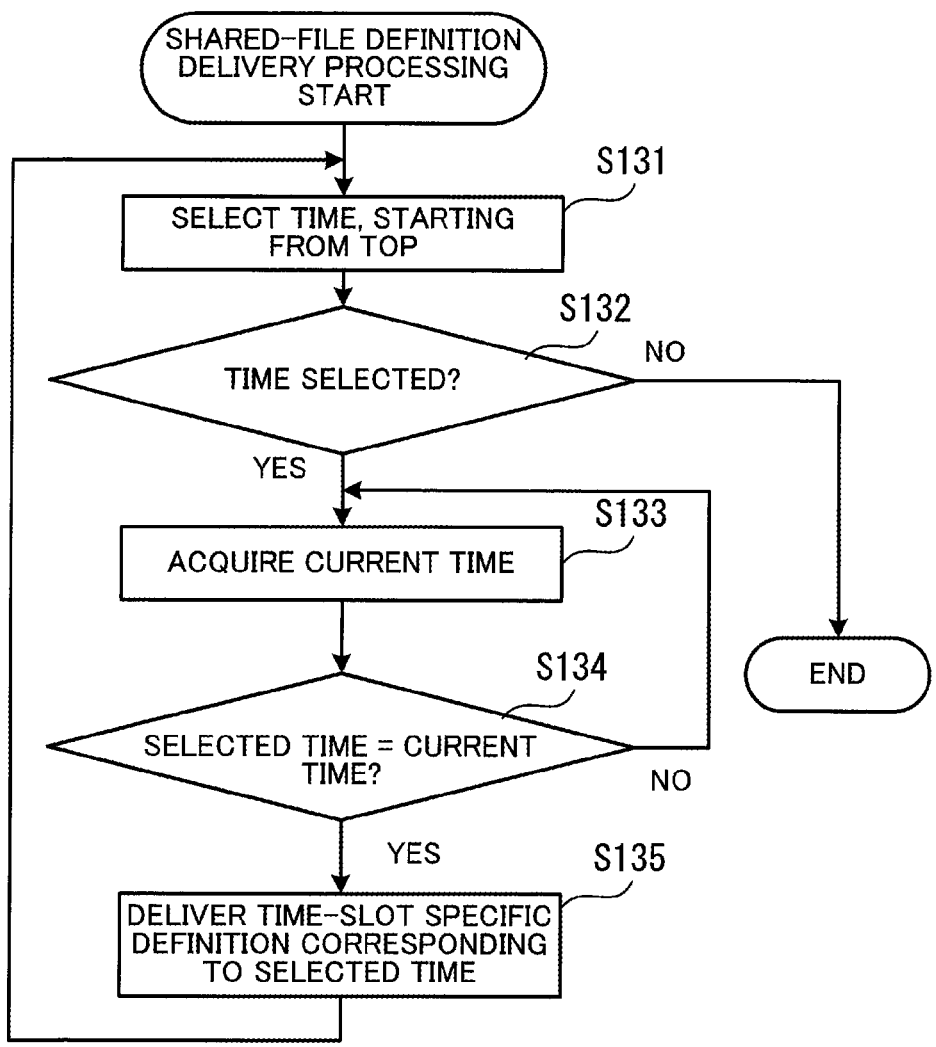
FIG. 18 is a flowchart illustrating an exemplary procedure of shared-file definition delivery processing.

FIG. 18 is a flowchart illustrating an exemplary procedure of shared-file definition delivery processing.

(Step S131) The controller 120 of the management server 100 selects an unselected time, starting from the top of the shared-file definition 70.

(Step S132) The controller 120 determines whether a time is selected in step S131. For example, once all the times in the shared-file definition 70 are selected, no time is selected in step S131. If no time is selected, the shared-file definition delivery processing ends. If a time is selected, the process proceeds to step S133.

(Step S133) The controller 120 acquires the current time. For example, the controller 120 acquires the current time from a time management function of the management server 100.

(Step S134) The controller 120 determines whether the selected time and the current time are identical. If the selected time and the current time are identical, the process proceeds to step S135. If not, the process returns to step S133.

(Step S135) The controller 120 delivers a time-slot specific definition corresponding to the selected time to the execution servers 200, 200a, 200b, and so on. The delivered time-slot specific definition is loaded in the memory of each of the execution servers 200, 200a, 200b, and so on. Then, the process returns to step S131.

After the time-slot specific definition of the first time in the shared-file definition is delivered, the controller 120 transmits an execution instruction of a job to an execution server in accordance with the execution schedule. Then, the execution server executes the job.

Figure 19:
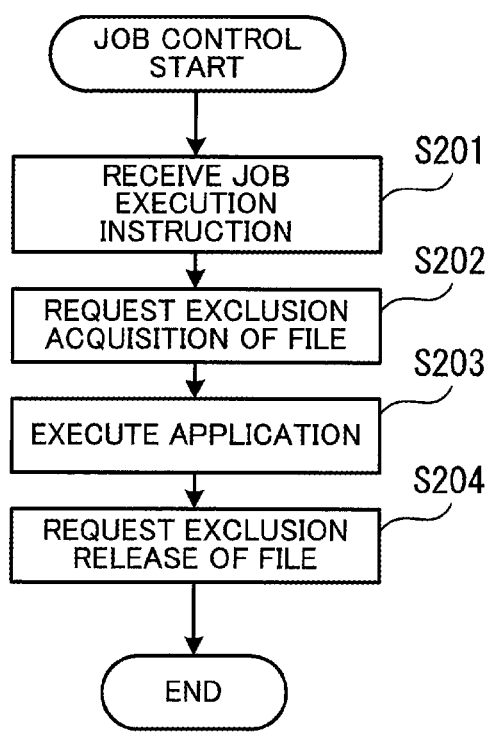
FIG. 19 is a flowchart illustrating an exemplary procedure of job control processing performed by an execution server.

FIG. 19 is a flowchart illustrating an exemplary procedure of job control processing performed by an execution server. The processing of FIG. 19 will be described in connection with an example in which the execution server 200 performs job control.

(Step S201) The job control unit 211 receives an execution instruction of a job from the management server 100. The execution instruction of a job contains a job definition of a job to be executed, for example.

(Step S202) The job control unit 211 requests the file management unit 230 for exclusion acquisition of a file. For example, the job control unit 211 acquires the "directory name+file name" of a file used by the job, from the job definition of the job to be executed. Then, the job control unit 211 transmits a request for exclusion acquisition in which the file that is the subject of exclusive control is specified by the "directory name+file name" to the file management unit 230.

(Step S203) The job control unit 211 executes the application specified by the job definition. At this point, the job control unit 211 specifies the content of the job to be executed, by inputting information such as a parameter included in the job definition and the like in the application.

(Step S204) When the execution of the job by the application is completed, the job control unit 211 transmits an exclusion release request of the file to the file management unit 230. Then, the job control ends.

In this way, an exclusive control request of a file is output when the job execution starts and when the job execution ends. In response to the output exclusive control request, the file management unit 230 transmits an exclusive control request to a file management server which manages the file that is the subject of exclusive control.

Figure 20:
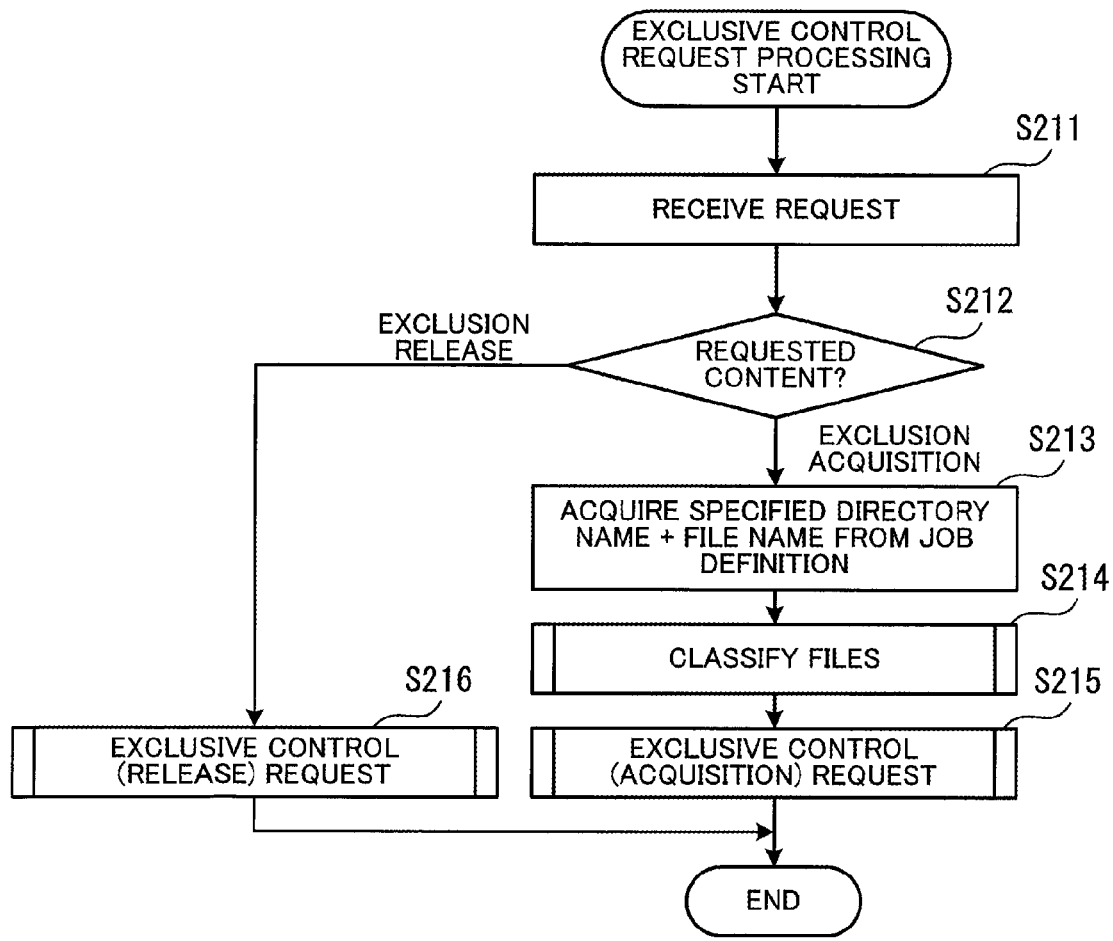
FIG. 20 is a flowchart illustrating an exemplary procedure of exclusive control request processing.

FIG. 20 is a flowchart illustrating an exemplary procedure of exclusive control request processing.

(Step S211) The file management unit 230 receives an exclusive control request from the job control unit 211.

(Step S212) The file management unit 230 determines the content of the exclusive control request. If the request is an exclusion acquisition request, the process proceeds to step S213. If the content is an exclusion release request, the process proceeds to step S216.

(Step S213) When the request is an exclusion acquisition request, the file management unit 230 acquires the "directory name+file name" of each of the files used by the job, from the job definition.

(Step S214) The file management unit 230 classifies the files used by the job according to the file management servers that manage the files. This processing will be described below in greater detail (see FIG. 21).

(Step S215) The file management unit 230 requests each of the file management servers that manage the files used by the job for exclusive control for exclusion acquisition. This processing will be described below in greater detail (see FIG. 23). Then, the exclusive control request processing ends.

(Step S216) When the request is an exclusion release request, the file management unit 230 requests each of the file management servers that manage the files used by the job for exclusive control for exclusion release. This processing will be described below in greater detail (see FIG. 24). Then, the exclusive control request processing ends.

Next, the file classification processing will be described in detail.

Figure 21:
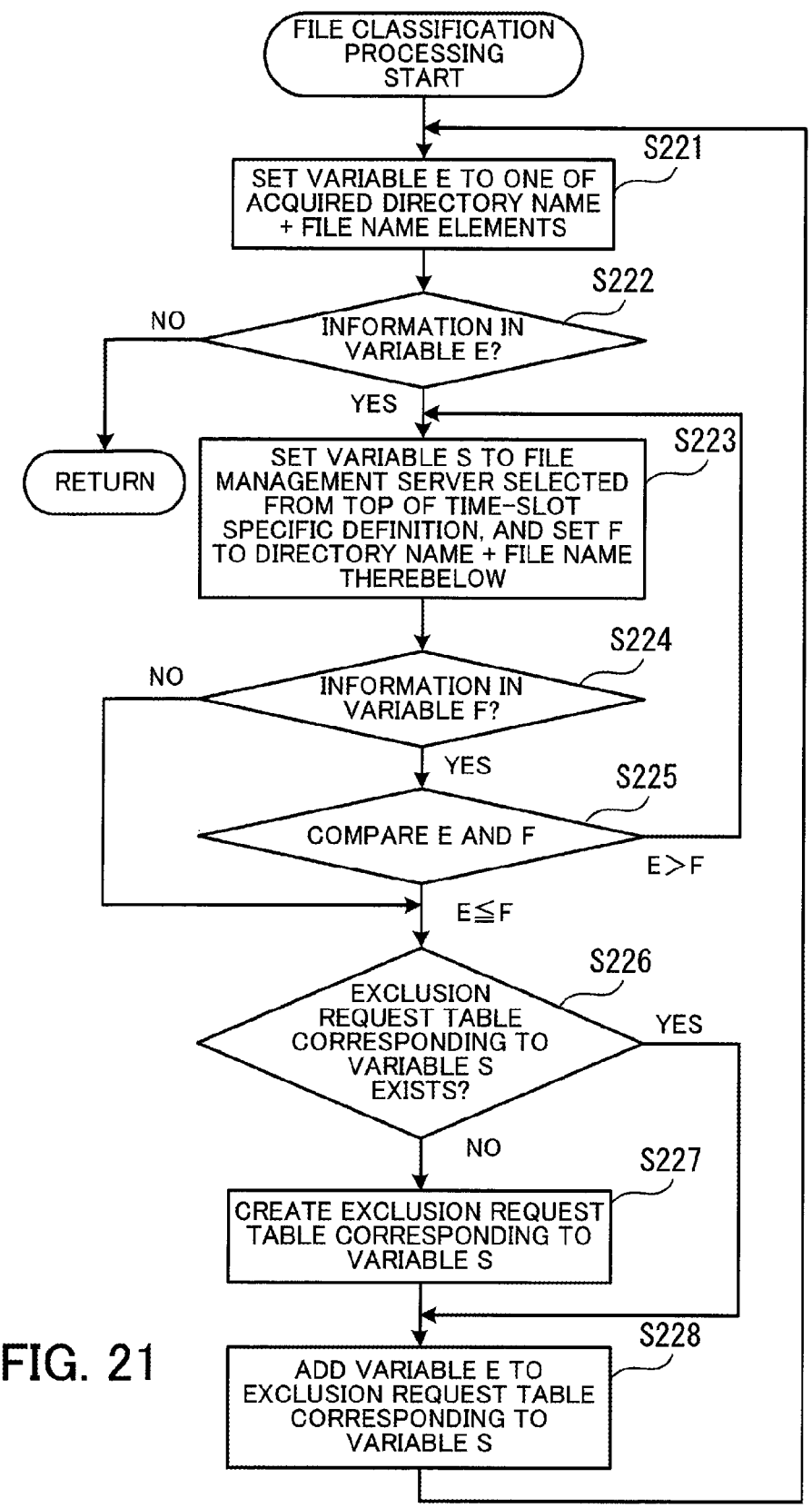
FIG. 21 is a flowchart illustrating an exemplary procedure of file classification processing.

FIG. 21 is a flowchart illustrating an exemplary procedure of file classification processing.

(Step S221) The file management unit 230 sets a variable E to an unprocessed "directory name+file name" element from among the "directory name+file name" elements acquired in step S213 (see FIG. 20).

(Step S222) The file management unit 230 determines whether information is set in the variable E by the processing of step S221. For example, in the case where the processing of step S221 is performed after all the acquired "directory name+file name" elements are selected, no information is set in the variable E. If no information is set, the file classification processing ends. If information is set, the process proceeds to step S223.

(Step S223) The file management unit 230 selects an unselected file management server from among the file management servers indicated by the time-slot specific definition that is loaded in advance in the memory, and sets a variable S to the file management server. For example, the time-slot specific definition indicates file management servers by their IP addresses. Thus, the file management unit 230 selects one of the IP addresses of the file management servers from the time-slot specific definition. Further, the file management unit 230 sets a variable F to the "directory name+file name" below the selected file management server (IP address).

(Step S224) The file management unit 230 determines whether information is set in the variable F. For example, in the case where the file management server selected in step S223 is the last file management server in the time-slot specific definition, there is no "directory name+file name" therebelow. In this case, no information is set in the variable F. If no information is set, the process proceeds to step S226. If information is set, the process proceeds to step S225.

(Step S225) The file management unit 230 compares the string of the "directory name+file name" in the variable E and the string of the "directory name+file name" in the variable F. For example, the file management unit 230 compares the strings, and determines which "directory name+file name" is placed at a higher position when the strings are sorted. When sorting the strings, for example, the character codes are compared, starting with the first character of each string. Then, based on the first different character codes, the string having a greater character code value is placed higher. If the string in the variable E is placed lower (the value of the character code of E is greater), the process returns to step S223. If the strings are identical or if the string in the variable E is placed higher (the value of the character code of F is greater), the process proceeds to step S226.

(Step S226) The file management unit 230 determines whether there is an exclusion request table corresponding to the server that is set in the variable S. If there is the corresponding exclusion request table, the process proceeds to step S228. If there is no corresponding exclusion request table, the process proceeds to step S227.

(Step S227) The file management unit 230 creates an exclusion request table corresponding to the server that is set in the variable S.

(Step S228) The file management unit 230 adds the "directory name+file name" in the variable E to the exclusion request table corresponding to the variable S. Then, the process returns to step S221.

In this way, exclusion request tables of respective file management servers are created, and the "directory name+file name" of the file used by the job is set in any one of the exclusion request tables.

Figure 22:
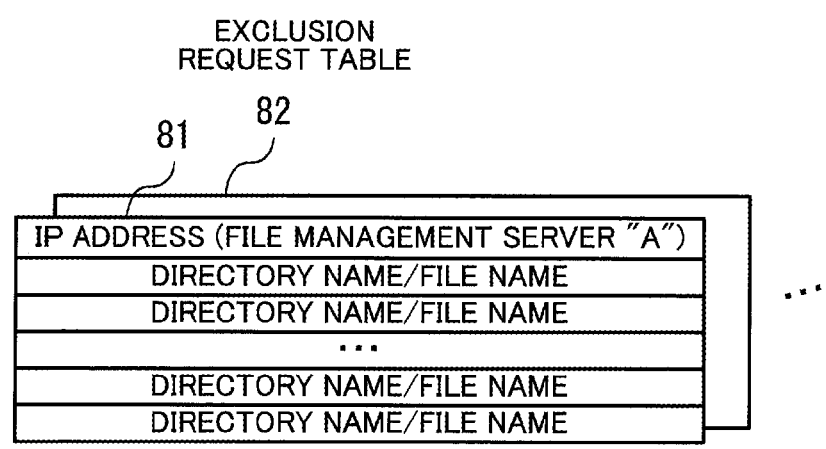
FIG. 22 illustrates an example of an exclusion request table.

FIG. 22 illustrates an example of an exclusion request table. Exclusion request tables 81, 82, and so on are provided for the respective file management servers. For example, the exclusion request tables 81, 82, and so on are associated with the IP addresses of the respective file management servers. Further, in each of the exclusion request tables 81, 82, and so on, the "directory name+file name" of each of the files used by the corresponding file management server out of the files used by the job to be executed is provided.

Thus, it is possible to request exclusive control requests of a plurality of files at one time by transmitting such an exclusion request table to a file management server.

Figure 23:
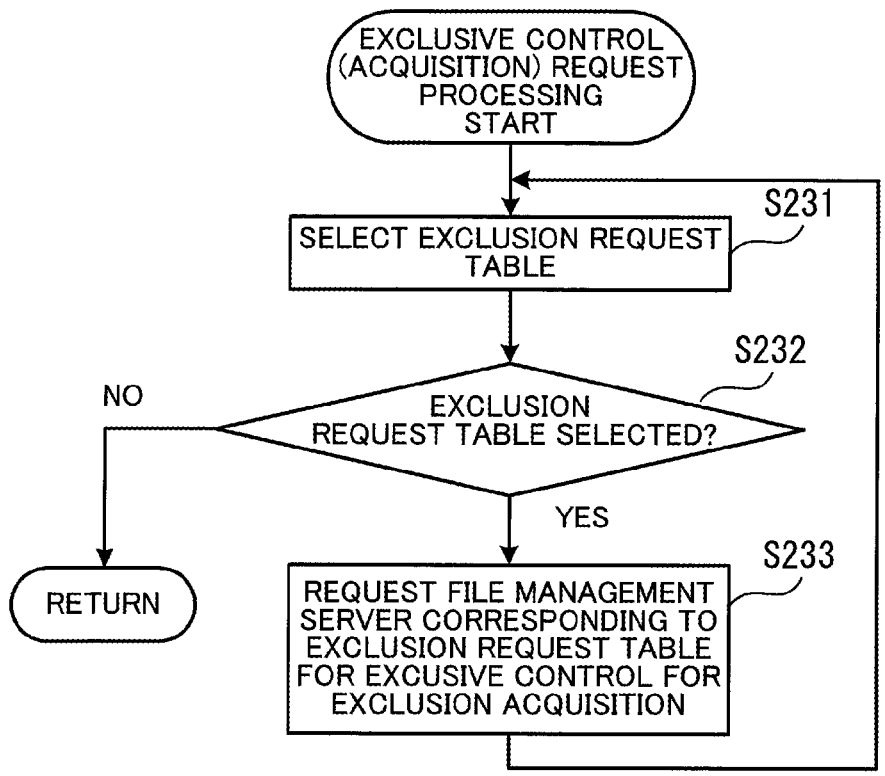
FIG. 23 is a flowchart illustrating an exemplary procedure of exclusive control request for exclusion acquisition.

FIG. 23 is a flowchart illustrating an exemplary procedure of exclusive control request for exclusion acquisition.

(Step S231) The file management unit 230 selects one of the unselected exclusion request tables.

(Step S232) The file management unit 230 determines whether an exclusion request table is selected in step S231. For example, in the case where all the exclusion request tables have been selected and there is no unselected exclusion request table when performing step S231, no exclusion request table is selected. If no exclusion request table is selected, the exclusive control request processing for exclusion acquisition ends. If an exclusion request table is selected, the process proceeds to step S233.

(Step S233) The file management unit 230 transmits, to the file management server corresponding to the selected exclusion request table, an exclusive control request for exclusion acquisition of the files that are set in the exclusion request table. For example, the file management unit 230 transmits an exclusion acquisition request containing job names indicated in the job definitions and the exclusion request table to the IP address corresponding to the exclusion request table. Then, the process returns to step S231.

When the exclusion acquisition of the files that are used by the job is completed, the execution server executes the job. Then, when the execution of the job is completed, an exclusive control request for exclusion release is made.

Figure 24:
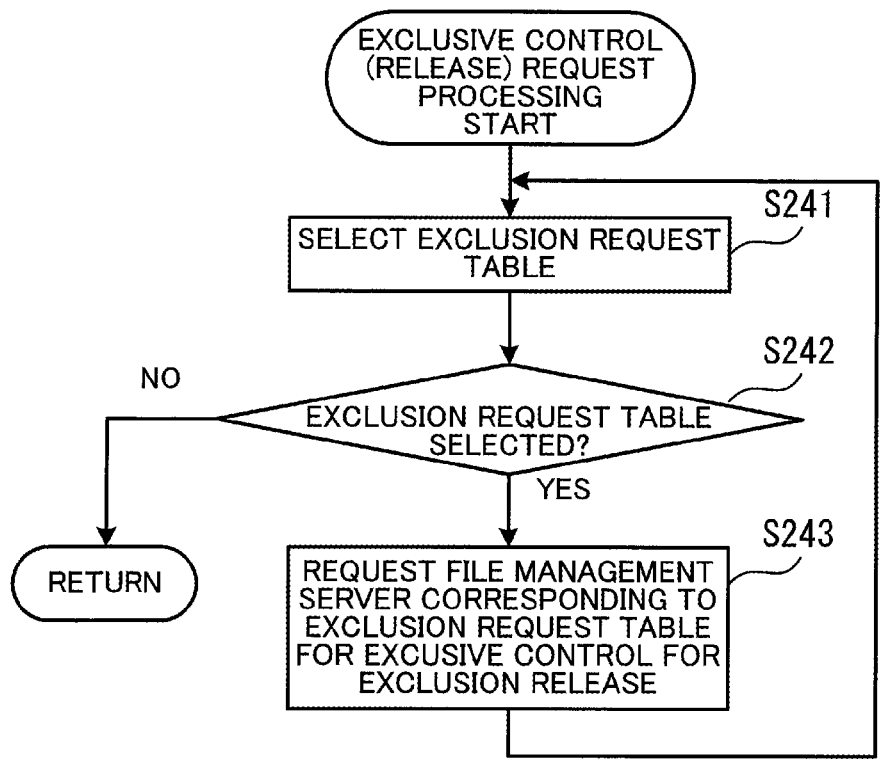
FIG. 24 is a flowchart illustrating an exemplary procedure of exclusive control request for exclusion release.

FIG. 24 is a flowchart illustrating an exemplary procedure of exclusive control request for exclusion release.

(Step S241) The file management unit 230 selects one of the unselected exclusion request tables.

(Step S242) The file management unit 230 determines whether an exclusion request table is selected in step S241. For example, in the case where all the exclusion request tables have been selected and there is no unselected exclusion request table when performing step S241, no exclusion request table is selected. If no exclusion request table is selected, the exclusive control request processing for exclusion release ends. If an exclusion request table is selected, the process proceeds to step S243.

(Step S243) The file management unit 230 transmits, to the file management server corresponding to the selected exclusion request table, an exclusive control request for exclusion release of the files that are set in the exclusion request table. For example, the file management unit 230 transmits an exclusion release request containing job names indicated in the job definitions and the exclusion request table to the IP address corresponding to the exclusion request table. Then, the process returns to step S241.

Next, the exclusive control processing performed by the file management server will be described.

Figure 25:
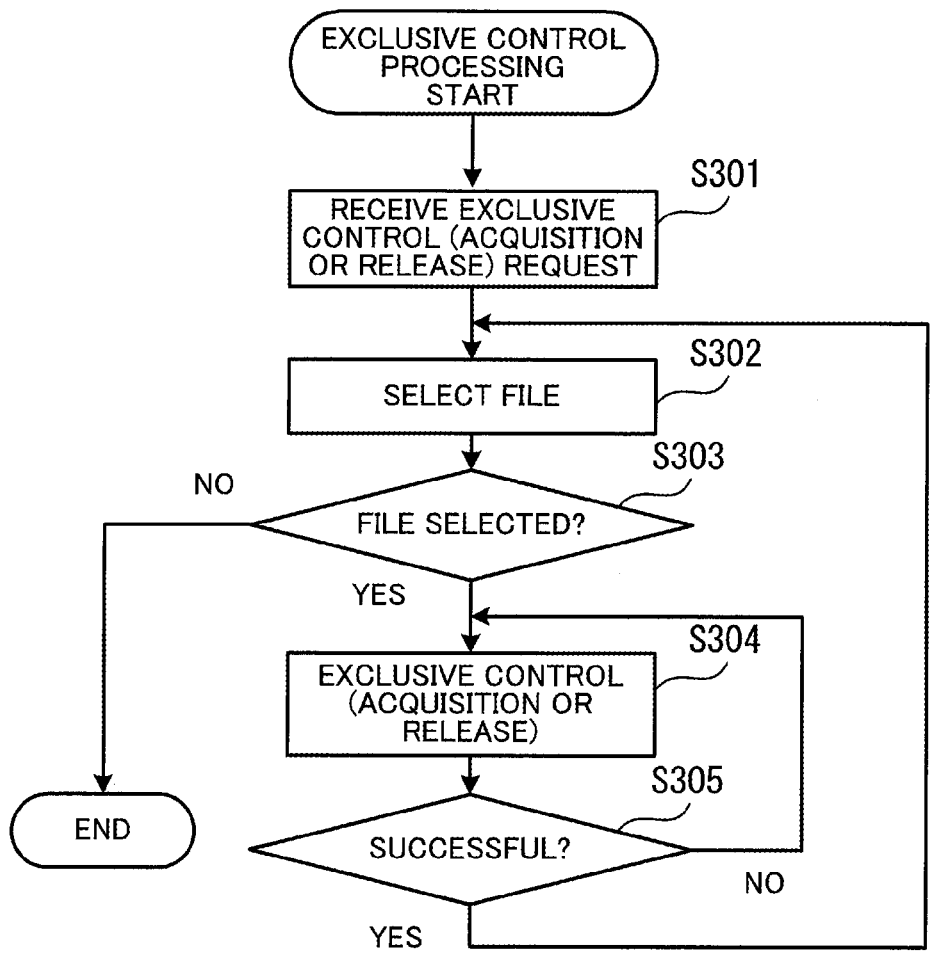
FIG. 25 is a flowchart illustrating an exemplary procedure of exclusive control processing.

FIG. 25 is a flowchart illustrating an exemplary procedure of exclusive control processing.

(Step S301) The file exclusive control unit 410 of the file management server 400 receives, from any of the execution servers, an exclusive control request for exclusion acquisition or exclusion release. The exclusive control request contains an exclusion request table indicating files that are the subjects of exclusive control and the job names of the jobs that use the files.

(Step S302) The file exclusive control unit 410 selects an unselected file from among the files that are the subjects of control.

(Step S303) The file exclusive control unit 410 determines whether a file is selected in step S302. For example, in the case where the processing of step S302 is performed after all the files are selected, no file is selected. If no file is selected, the exclusive control processing ends. If a file is selected, the process proceeds to step S304.

(Step S304) The file exclusive control unit 410 performs exclusive control. For example, in the case of an exclusive control request for exclusion acquisition, the file exclusive control unit 410 places each of files corresponding to the "directory name+file name" elements indicated in the exclusion request table contained in the exclusive control request in a state of exclusive use by the job indicated in the exclusive control request. The file exclusive control unit 410 prevents applications other than the application executing the job that exclusively uses the file from making an exclusive control request of the file or updating the file. Further, in the case of an exclusive control request for exclusion release, the file exclusive control unit 410 places each of files corresponding to the "directory name+file name" elements indicated in the exclusion request table contained in the exclusive control request in a released state. When placed in a released state, the file is released from the exclusive use state, thereby allowing any job to exclusively use the file.

(Step S305) The file exclusive control unit 410 determines whether the exclusive control of step S304 is successful. If the exclusive control is successful, the process returns to step S302. If not, the process returns to step S304.

In this way, it is possible to appropriately distribute the exclusive control of files in a distributed system environment, and thus to prevent the exclusive control of files from becoming a bottleneck. This makes it possible to efficiently operate the entire system.

Further, when executing a job, a file management server that manages a file used by the job is automatically determined, and the file management server performs exclusive control of the file. In this way, since the load of exclusive control request of files is automatically distributed, the user does not need to be care about an increase in the number of exclusive control requests of files. Accordingly, the human load associated with system operation is reduced. Further, since determination on whether to change the destinations of exclusive control requests does not involve determination by a person, it is possible to prevent exclusive control requests from being inappropriately distributed due to a determination error by a person.

Further, in the second embodiment, processing of determining the destinations of exclusive control requests is performed only for a time slot with more than a predetermined number of exclusive control requests, for example. This makes it possible to appropriately determine a time slot in which the number of exclusive control requests becomes excessive, and thus to appropriately distribute the destinations of the exclusive control requests in that time slot. Further, since the destination of exclusive control requests is changed only for the time slot in which the number of exclusive control requests becomes excessive, it is possible to reduce the processing load on the system in the time slots in which there is no risk of delay in exclusive control.

Note that although a file management server that performs exclusive control of a file is determined on a per-file basis in the second embodiment, a file management server that performs exclusive control of files in a directory may be determined on a per-directory basis. However, in the case of performing distribution of exclusive control in units of directories, if all the files are stored in the same directory, it is not possible to distribute the exclusive control processing. Therefore, in the case where a large number of files are stored in the same directory, it is appropriate to determine a file management server that performs exclusive control of a file, on a per-file basis.

Further, in the second embodiment, the job scheduler 110 creates the execution schedule 50 of jobs. However, an execution schedule 50 that is arbitrarily edited by the user may be input to the controller 120.

According to one aspect, it is possible to appropriately distribute exclusive control requests of files.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
    specifying processes that make exclusive control requests of files in a predetermined time slot, based on an execution schedule of a plurality of processes;
    specifying files that are subjects of exclusive control in the predetermined time slot, based on utilization file information indicating files that are used by the respective processes; and
    determining a plurality of file management servers as destinations of exclusive control requests of the respective specified files such that the number of exclusive control requests to be transmitted to each of the file management servers in the predetermined time slot is not greater than a predetermined number of exclusive control requests, each of the file management servers being configured to perform exclusive control of a file.

2. The non-transitory computer-readable storage medium according to claim 1, the process further comprising:
    transmitting destination information indicating the file management servers as the destinations of the exclusive control requests of the respective specified files, to execution servers that perform the specified processes.

3. The non-transitory computer-readable storage medium according to claim 2, wherein the transmitting includes transmitting the destination information when start time of the predetermined time slot comes.

4. The non-transitory computer-readable storage medium according to claim 1, wherein the specifying processes includes dividing an execution period of the processes into a plurality of unit time slots and, when the number of exclusive control requests of files that are made in a unit time slot is greater than a predetermined number of exclusive control requests, determining the unit time slot as the predetermined time slot.

5. The non-transitory computer-readable storage medium according to claim 1, wherein the specifying processes includes determining processes that start or end in the predetermined time slot as the processes that make exclusive control requests of files in the predetermined time slot.

6. The non-transitory computer-readable storage medium according to claim 1, wherein the determining includes determining the destinations of the exclusive control requests such that an equal number of exclusive control requests are transmitted to each of the file management servers.

7. An exclusive control request allocation method comprising:
   specifying, by a processor, processes that make exclusive control requests of files in a predetermined time slot, based on an execution schedule of a plurality of processes;
   specifying, by the processor, files that are subjects of exclusive control in the predetermined time slot, based on utilization file information indicating files that are used by the respective processes; and
   determining, by the processor, a plurality of file management servers as destinations of exclusive control requests of the respective specified files such that the number of exclusive control requests to be transmitted to each of the file management servers in the predetermined time slot is not greater than a predetermined number of exclusive control requests, each of the file management servers being configured to perform exclusive control of a file.

8. A system comprising:
   a storage apparatus configured to store a plurality of files;
   a plurality of file management servers each configured to perform exclusive control of a file stored in the storage apparatus, in response to an exclusive control request;
   a plurality of execution servers each configured to execute a process that uses a file stored in the storage apparatus; and
   a management server including a processor configured to perform a procedure including:
   specifying processes that make exclusive control requests of files in a predetermined time slot, based on an execution schedule of a plurality of processes,
   specifying files that are subjects of exclusive control in the predetermined time slot, based on utilization file information indicating files that are used by the respective processes,
   determining the plurality of file management servers as destinations of exclusive control requests of the respective specified files such that the number of exclusive control requests to be transmitted to each of the file management servers in the predetermined time slot is not greater than a predetermined number of exclusive control requests, each of the file management servers being configured to perform exclusive control of a file, and
   transmitting destination information indicating the file management servers as the destinations of the exclusive control requests of the respective specified files, to the execution servers that perform the specified processes.

\* \* \* \* \*